United States Patent
Chandran et al.

(10) Patent No.: US 9,920,926 B1
(45) Date of Patent: Mar. 20, 2018

(54) PULSE COMBUSTION HEAT EXCHANGER SYSTEM AND METHOD

(71) Applicant: ThermoChem Recovery International, Inc., Baltimore, MD (US)

(72) Inventors: Ravi Chandran, Ellicott City, MD (US); Dave G. Newport, Cumberland, ME (US); Daniel A. Burciaga, Manchester, MD (US); Daniel Michael Leo, Baltimore, MD (US); Justin Kevin Miller, Durham, NC (US); Kaitlin Emily Harrington, Hillsborough, NC (US); Brian Christopher Attwood, Cary, NC (US); Hamilton Sean Michael Whitney, Baltimore, MD (US)

(73) Assignee: ThermoChem Recovery International, Inc., Baltimore, MD (US)

( * ) Notice: Subject to any disclaimer, the term of this patent is extended or adjusted under 35 U.S.C. 154(b) by 0 days.

(21) Appl. No.: 15/645,068

(22) Filed: Jul. 10, 2017

(51) Int. Cl.
| | |
|---|---|
| *F02C 5/00* | (2006.01) |
| *F23C 15/00* | (2006.01) |
| *F28D 21/00* | (2006.01) |
| *F24H 9/18* | (2006.01) |
| *G01L 19/00* | (2006.01) |

(52) U.S. Cl.
CPC ........... *F23C 15/00* (2013.01); *F24H 9/1836* (2013.01); *F28D 21/0008* (2013.01); *G01L 2019/0053* (2013.01)

(58) Field of Classification Search
CPC .... F23C 15/00; F24H 9/1836; F28D 21/0008; G01L 2019/0053
See application file for complete search history.

(56) References Cited

U.S. PATENT DOCUMENTS

| | | | |
|---|---|---|---|
| 2,619,124 A | 11/1952 | Bertin et al. | |
| 2,642,895 A | 6/1953 | Bertin et al. | |
| 2,670,011 A | 2/1954 | Bertin et al. | |
| 2,727,535 A | 12/1955 | Linderoth | |
| 2,795,931 A | 6/1957 | Foll | |
| 2,812,635 A | 11/1957 | Foll et al. | |
| 2,825,203 A | 3/1958 | Bertin et al. | |
| 2,912,821 A | 11/1959 | Horak | |
| 3,674,409 A | 7/1972 | Desty et al. | |
| 3,894,562 A | 7/1975 | Moseley, Jr. et al. | |
| 3,910,494 A | 10/1975 | Melton, Jr. | |
| 3,954,380 A | 5/1976 | Valaev et al. | |
| 4,080,149 A | 3/1978 | Wolfe | |
| 4,484,885 A | 11/1984 | Machii et al. | |

(Continued)

FOREIGN PATENT DOCUMENTS

CA 975643 10/1975

*Primary Examiner* — Alfred Basichas
(74) *Attorney, Agent, or Firm* — Womble Bond Dickinson (US) LLP

(57) ABSTRACT

A pulse combustion heat exchanger having a longitudinal axis is configured to accept oxidant and fuel and output a cooled combustion stream. The pulse combustion heat exchanger includes an oxidant inlet section that accepts oxidant, a fuel inlet section that accepts fuel, a mixing section that mixes oxidant with fuel, a combustion section that receives the oxidant and fuel and produces a pulsating combustion stream, and a heat transfer section configured to receive the pulsating combustion stream, the heat transfer section includes one or more resonance conduits. Coolant is employed at a plurality of longitudinally spaced-apart transition sections to remove heat.

22 Claims, 22 Drawing Sheets

(56) References Cited

U.S. PATENT DOCUMENTS

| | | |
|---|---|---|
| 4,569,310 A | 2/1986 | Davis |
| 4,639,208 A | 1/1987 | Inui et al. |
| 4,697,358 A | 10/1987 | Kitchen |
| 4,909,914 A | 3/1990 | Chiba et al. |
| 4,959,009 A | 9/1990 | Hemsath |
| 5,059,404 A | 10/1991 | Mansour et al. |
| 5,133,297 A | 7/1992 | Mansour |
| 5,168,835 A | 12/1992 | Last |
| 5,197,399 A | 3/1993 | Mansour |
| 5,205,728 A | 4/1993 | Mansour |
| 5,211,704 A | 5/1993 | Mansour |
| 5,255,634 A | 10/1993 | Mansour |
| 5,306,481 A | 4/1994 | Mansour et al. |
| 5,353,721 A | 10/1994 | Mansour et al. |
| 5,366,371 A | 11/1994 | Mansour et al. |
| 5,473,885 A | 12/1995 | Hunter, Jr. et al. |
| 5,536,488 A | 7/1996 | Mansour et al. |
| 5,637,192 A | 6/1997 | Mansour et al. |
| 5,638,609 A | 6/1997 | Chandran et al. |
| 5,800,153 A | 9/1998 | DeRoche |
| 5,842,289 A | 12/1998 | Chandran et al. |
| 5,937,635 A | 8/1999 | Winfree et al. |
| 6,149,765 A | 11/2000 | Mansour et al. |
| 6,216,446 B1 | 4/2001 | Stram |
| 6,446,428 B1 | 9/2002 | Kaemming et al. |
| 6,494,034 B2 | 12/2002 | Kaemming et al. |
| 6,548,197 B1 | 4/2003 | Chandran et al. |
| 6,584,765 B1 | 7/2003 | Tew et al. |
| 6,662,550 B2 | 12/2003 | Eidelman et al. |
| 6,758,032 B2 | 7/2004 | Hunter et al. |
| 6,793,174 B2 | 9/2004 | Ouellette et al. |
| 6,824,383 B2 | 11/2004 | Cain |
| 6,883,543 B2 | 4/2005 | Tew et al. |
| 6,923,004 B2 | 8/2005 | Chandran et al. |
| 6,931,833 B2 | 8/2005 | Lupkes |
| 6,938,588 B2 | 9/2005 | Jacobsen et al. |
| 6,997,118 B2 | 2/2006 | Chandran et al. |
| 7,047,724 B2 | 5/2006 | Nordeen et al. |
| 7,434,401 B2 | 10/2008 | Hayashi |
| 7,526,912 B2 | 5/2009 | Tangirala et al. |
| 7,531,014 B2 | 5/2009 | Chandran |
| 7,569,086 B2 | 8/2009 | Chandran |
| 7,637,096 B2 | 12/2009 | Razzell et al. |
| 7,735,311 B2 | 6/2010 | Eidelman et al. |
| 7,739,867 B2 | 6/2010 | Kenyon et al. |
| 7,758,334 B2 | 7/2010 | Shimo et al. |
| 7,775,460 B2 | 8/2010 | Berg et al. |
| 7,784,265 B2 | 8/2010 | Rasheed et al. |
| 7,828,546 B2 | 11/2010 | Wiedenhoefer et al. |
| 7,836,682 B2 | 11/2010 | Rasheed et al. |
| 7,841,167 B2 | 11/2010 | Rasheed et al. |
| 7,842,110 B2 | 11/2010 | Mansour et al. |
| 7,882,926 B2 | 2/2011 | Fullerton |
| 7,886,866 B2 | 2/2011 | Fullerton |
| 7,914,280 B2 | 3/2011 | Schlote et al. |
| 7,950,219 B2 | 5/2011 | Tangirala et al. |
| 7,980,056 B2 | 7/2011 | Rasheed et al. |
| 8,082,724 B2 | 12/2011 | Hirata et al. |
| 8,083,494 B2 | 12/2011 | Laforest et al. |
| 8,136,624 B2 | 3/2012 | Fullerton |
| 8,205,433 B2 | 6/2012 | Boespflug et al. |
| 8,302,377 B2 | 11/2012 | Rasheed et al. |
| 8,312,706 B2 | 11/2012 | Laforest et al. |
| 8,356,467 B2 | 1/2013 | Sprouse et al. |
| 8,381,527 B2 | 2/2013 | LaForest et al. |
| 8,539,752 B2 | 9/2013 | Brumberg et al. |
| 8,707,674 B2 | 4/2014 | Moscinski et al. |
| 8,813,474 B2 | 8/2014 | Daniau et al. |
| 8,899,010 B2 | 12/2014 | Kenyon et al. |
| 8,955,303 B2 | 2/2015 | Brzek et al. |
| 8,968,433 B2 | 3/2015 | Chandran |
| 9,080,513 B2 | 7/2015 | Ziminsky et al. |
| 9,084,978 B2 | 7/2015 | Peters |
| 9,140,456 B2 | 9/2015 | Kenyon et al. |
| 9,217,569 B2 | 12/2015 | Prade |
| 9,268,048 B2 | 2/2016 | Fullerton |
| 9,279,503 B2 | 3/2016 | DiSalvo et al. |
| 9,359,973 B2 | 6/2016 | Farshchian et al. |
| 9,512,997 B2 | 12/2016 | Zettner |
| 2005/0050759 A1 | 3/2005 | Chandran et al. |
| 2006/0246388 A1 | 11/2006 | Feese et al. |
| 2006/0251821 A1 | 11/2006 | Eidelman |
| 2009/0056537 A1 | 3/2009 | Neumann |
| 2009/0084036 A1 | 4/2009 | Neumann |
| 2009/0139203 A1 | 6/2009 | Rasheed et al. |
| 2009/0320446 A1 | 12/2009 | Gutmark et al. |
| 2011/0047961 A1 | 3/2011 | Kenyon et al. |
| 2011/0047962 A1 | 3/2011 | Kenyon et al. |
| 2011/0146285 A1 | 6/2011 | Glaser et al. |
| 2012/0131901 A1 | 5/2012 | Westervelt et al. |
| 2012/0204814 A1 | 8/2012 | Zhang et al. |
| 2013/0042595 A1 | 2/2013 | Rasheed et al. |
| 2017/0082067 A1 | 3/2017 | Maqbool |

AEROVALVE, FIRST EMBODIMENT, TWO SURFACES
FIRST FORWARD VIEW (II–II in FIG. 1)

AEROVALVE, SECOND EMBODIMENT, TWO SURFACES
SECOND FORWARD VIEW (IV–IV in FIG. 3)

AEROVALVE, THIRD EMBODIMENT, THREE SURFACES
THIRD SIDE CROSS-SECTIONAL VIEW (V--V in FIG. 6)

AEROVALVE, THIRD EMBODIMENT, THREE SURFACES
THIRD FORWARD VIEW (VI–VI in FIG. 5)

COMBUSTION SECTION SIDE-VIEW (IX–IX in FIG. 8)

OXIDANT INLET SECTION SIDE-VIEW (XI–XI in FIG. 10)

OXIDANT INLET SECTION SIDE-VIEW (XI--XI in FIG. 10)

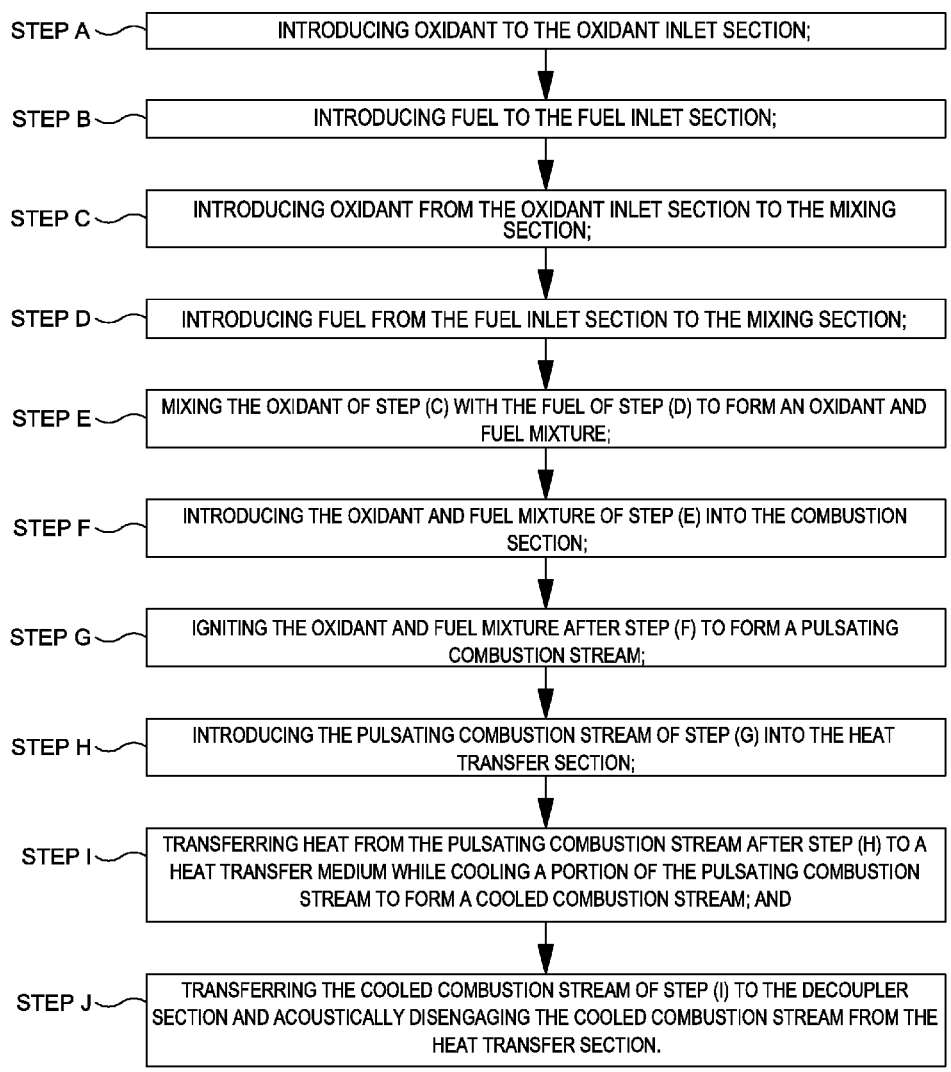

PULSE COMBUSTION HEAT EXCHANGER SYSTEM AND METHOD

TECHNICAL FIELD

The present disclosure relates to improvements to pulse combustion heat exchangers.

BACKGROUND

Efficient, reliable, and robust pulse combustion heat exchanger systems are needed to meet industrial process heat transfer demands in such areas as energy, chemicals, fuels, and materials processing. Pulse combustion heat exchangers typically operate on the Helmholtz principle and offer advantages in comparison to conventional combustion-based fire tube heat exchangers, including:

Periodic boundary layer scrubbing, reduced heat transfer resistance and enhanced and more uniform heat flux rate to reduce heat exchanger size for a specified heat transfer duty and improve thermal efficiency;
High combustion efficiency;
Low NOx emissions and in turn improved environmental performance;
Fuels flexibility.

Pulse combustion heat exchangers typically operate in an elevated temperature environment (1,000 to 1,500° F.). So, this heat exchanger must be carefully designed and engineered to minimize thermal stress and creep, maximize structural integrity and equipment lifespan, and should be capable of providing continuous operation and up-time while minimizing maintenance and shut-down periods.

SUMMARY

This Summary is provided merely to introduce certain concepts and not to identify any key or essential features of the claimed subject matter.

Paragraph A: A pulse combustion heat exchanger (1000) that is configured to accept oxidant (1A1) and fuel (1A2) and output a cooled combustion stream (1A5), including:
(a) an oxidant inlet section (100) that is configured to accept oxidant (1A1);
(b) a fuel inlet section (200) that is configured to accept fuel (1A2);
(c) a mixing section (300) including one or more aerovalves (A, A', A'', A''', $A^N$, $A^{N+1}$) that are configured to accept and mix oxidant (1A1) from the oxidant inlet section (100) with fuel (1A2) from the fuel inlet section (200) to create an oxidant and fuel mixture (1A3);
(d) a combustion section (400) configured to receive and combust the oxidant and fuel mixture (1A3) from the mixing section (300) to produce a pulsating combustion stream (1A4);
(e) a heat transfer section (500) configured to receive the combustion stream (1A4) from the combustion section (400), the heat transfer section (500) including one or more resonance conduits (502, 502A, 502B, 502C, 502D, 502E) that are configured to transfer heat from the combustion stream (1A4) to an energy sink (V108), wherein combustion of the oxidant and fuel mixture (1A3) may continue to take place within the heat transfer section (500);
(f) a first transition section (450) positioned between the combustion section (400) and the heat transfer section (500), the first transition section (450) comprising a first coolant path configured to receive a first coolant (451);
(g) a second transition section (650) connected to the heat transfer section (500) and configured to receive the combustion stream (1A4) from the heat transfer section (500) and output a cooled combustion stream (1A5), the second transition section (650) comprising a second coolant path configured to receive a second coolant (651); and
(h) a decoupler section (600) connected to the second transition section (650) and configured to accept the cooled combustion stream (1A5) from the second transition section (650) and output the cooled combustion stream (1A5) via a combustion stream outlet (606).

Paragraph B: The pulse combustion heat exchanger (1000) according to Paragraph A, wherein the first transition section (450) comprises:
a first pair of parallel tubesheets (403, 457) defining a first interior space (450-1) therebetween;
a first coolant inlet (452) in fluid communication with the first interior space (450-1) that is configured to receive the first coolant (451); and
a first coolant outlet (454) in fluid communication with the first interior space (450-1); wherein:
the first coolant inlet (452), the first interior space (450-1) and the first coolant outlet (454) together define the first coolant path through the first transition section (450).

Paragraph C: The pulse combustion heat exchanger (1000) according to Paragraph B, wherein the second transition section (650) comprises:
a second pair of parallel tubesheets (603, 657) defining a second interior space (650-1) therebetween;
a second coolant inlet (652) in fluid communication with the second interior space (650-1) that is configured to receive the second coolant (652); and
a second coolant outlet (654) in fluid communication with the second interior space (650-1); wherein:
the second coolant inlet (652), the second interior space (650-1) and the second coolant outlet (654) together define the second coolant path through the second transition section (450).

Paragraph D: The pulse combustion heat exchanger (1000) according to Paragraph A, further comprising:
a third transition section (350) positioned between the mixing section (300) and the combustion section (400) that is provided with a third coolant (351).

Paragraph E: The pulse combustion heat exchanger (1000) according to Paragraph D, wherein the third transition section (350) comprises:
a third pair of parallel tubesheets (357, 205) defining a third interior space (350-1) therebetween;
a third coolant inlet (352) in fluid communication with the third interior space (350-1) that is configured to receive the third coolant (351); and
a third coolant outlet (354), in fluid communication with the third interior space (350-1); wherein:
the third coolant inlet (352), the third interior space (350-1) and the third coolant outlet (354) together define a third coolant path through the third transition section (350).

Paragraph F: The pulse combustion heat exchanger (1000) according to Paragraph A, further comprising:
at least one ignitor (410, 410A, 410B) is in fluid communication with the combustion section (400); and
an ignitor input (412) configured to introduce an ignitor mixture (1A6) to the ignitor (410), the ignitor input (412) being in fluid communication with an ignitor oxidant supply and an ignitor fuel supply.

Paragraph G: The pulse combustion heat exchanger (1000) according to Paragraph F, further comprising:
a plurality of ignitors (410A, 410B) in fluid communication with the combustion section (400).

Paragraph H: The pulse combustion heat exchanger (1000) according to Paragraph A, further comprising:
a vessel (V100) having an interior (V102) defined by at least one side wall (V104); and
a heat transfer medium (V106) occupying the vessel's interior (V102) and configured to accept heat from the heat transfer section (500) and serve as an energy sink (V108).

Paragraph I: The pulse combustion heat exchanger (1000) according to Paragraph A, wherein:
the first transition section (450) is provided with a first coolant inlet (452) and a first coolant outlet (454);
the second transition section (650) is provided with a second coolant inlet (652) and a second coolant outlet (654);
the heat exchanger further comprises a coolant recycling drum (800) having a drum outlet (812) in fluid communication with the first and second coolant inlets (452, 652) and further having drum inlet (822) in fluid communication with the first and second coolant outlets (454, 654); and
a recycling pump (810) is interposed between the drum outlet (812) and the first and second coolant inlets (452, 652), the recycling pump (810) configured to supply coolant (815) under pressure to the first and second coolant inlets (452, 652).

Paragraph J: The pulse combustion heat exchanger (1000) according to Paragraph I, further comprising:
a first restriction orifice (RO1) positioned between the recycling pump (810) and the first coolant inlet (452); and
a second restriction orifice (RO2) positioned in between the recycling pump (810) and the second coolant inlet (652).

Paragraph K: The pulse combustion heat exchanger (1000) according to Paragraph I, further comprising:
a third transition section (350) between the mixing section (300) and the combustion section (400), the third transition section (350) having a third coolant inlet (352) and a third coolant outlet (354); wherein:
the drum outlet (812) is in fluid communication with the third coolant inlet (352) and the drum inlet (822) is in fluid communication with the third coolant outlet (354); and the recycling pump (810) is interposed between the drum outlet (812) and the third coolant inlet (352), the recycling pump (810) configured to supply coolant (815) under pressure to the third coolant inlet (352).

Paragraph L: The pulse combustion heat exchanger (1000) according to Paragraph K, further comprising:
a first restriction orifice (RO1) positioned between the recycling pump (810) and the first coolant inlet (452);
a second restriction orifice (RO2) positioned in between the recycling pump (810) and the second coolant inlet (652); and
a third restriction orifice (RO3) positioned between the coolant recycling drum (800) and the third coolant inlet (352).

Paragraph M: The pulse combustion heat exchanger (1000) according to Paragraph A, further comprising:
a third transition section (350) between the mixing section (300) and the combustion section (400), the third transition section (350) having a third coolant inlet (352) and a third coolant outlet (354);
a coolant recycling drum (800) having a drum outlet (812) in fluid communication with the third coolant inlet (352) and further having drum inlet (822) in fluid communication with the third coolant outlet (354); and
a recycling pump (810) interposed between the drum outlet (812) and the third coolant inlet (352), the recycling pump (810) configured to supply coolant (815) under pressure to the third coolant inlets (352).

Paragraph N: The pulse combustion heat exchanger (1000) according to Paragraph M, further comprising:
a third restriction orifice (RO3) positioned between the coolant recycling drum (800) and the third coolant inlet (352).

Paragraph O: The pulse combustion heat exchanger (1000) according to Paragraph A, further comprising:
a plurality of fuel injectors (370A, 370B) location in the fuel inlet section (200), each fuel injector including a fuel injector conduit (372A, 372B) connected to a fuel injector distributor (374A, 374B), wherein:
the fuel injector conduit (372A, 372B) is configured to accept said fuel (1A2), and
fuel injector distributor (374A, 374B) is configured to transfer the fuel (1A2) from the fuel injector conduit (372A, 372B) into the mixing section (300).

Paragraph P: A metal aerovalve (A), having an aerovalve longitudinal axis (X1), an outer surface (S) with an outer diameter (D0), an interior (A-IN), a rear end (1E1) having a rearwardly facing rear surface (1E1S), a forward end (2E1) having a forwardly facing forward surface (2E1S), and a total aerovalve length (L) defined between the rear and forward ends (1E1, 2E1) along the aerovalve longitudinal axis (X1), the aerovalve (A) further comprising:
an oxidant inlet (1A0) located at the rear end (1E1), the oxidant inlet (1A0) configured to introduce oxidant (1A1) into the interior (A-IN) of the aerovalve (A);
an oxidant and fuel mixture outlet (2A0) located at the forward end (2E1), the oxidant and fuel mixture outlet (2A0) configured to expel an oxidant and fuel mixture (1A3) present in the interior (A-IN) of the aerovalve (A);
a first plurality of fuel inlet ports (1A, 1B, 1C, $1^N$, $1^{N+1}$) opening to the outer surface (S), a second plurality of fuel outlet ports (2A, 2B, 2C, $2^N$, $2^{N+1}$) opening to the interior (A-IN), and a third plurality of fuel transfer channels (3A, 3B, 3C, $3^N$, $3^{N+1}$) configured to transfer fuel (1A2) from the first plurality of fuel inlet ports (1A, 1B, 1C, $1^N$, $1^{N+1}$) to the second plurality of fuel outlet ports (2A, 2B, 2C, $2^N$, $2^{N+1}$);
a first inner conical surface (S1) tapering radially inwardly at a first angle (A1) to a first inner diameter (D1), the first inner conical surface (S1) extending in the forward direction from proximate the rear end (1E1) for a first length (L1) along the aerovalve longitudinal axis (X1);
a second inner conical surface (S2) expanding radially outwardly at a second angle (A2) to a second inner diameter (D2), the second inner conical surface (S2) extending in the forward direction from proximate the first inner conical surface (S1) for a second length (L2) along the aerovalve longitudinal axis (X1), the second inner diameter (D2) being less than the outer diameter (D0); and a third inner conical surface (S3) expanding radially outwardly at a third angle (A3) to a third inner diameter (D3), the third inner conical surface (S3) extending in the forward direction from proximate the second inner conical surface (S2) for a third length (L3) along the aerovalve longitudinal axis (X1), the third inner diameter (D3) being greater than the first and second inner diameters (D1, D2) and less than the outer diameter (D0);

wherein:

the first angle (A1) is greater than the second angle (A2);

the third angle (A3) is greater than the second angle (A2); and the second plurality of fuel outlet ports (2A, 2B, 2C, $2^N$, $2^{N+1}$) are positioned on the third inner conical surface (S3).

Paragraph Q: A cylindrical metal aerovalve (A) according to Paragraph P, wherein the first angle (A1) ranges from between 30 degrees to 60 degrees.

Paragraph R: A cylindrical metal aerovalve (A) according to Paragraph P, wherein the second angle (A2) ranges from between 1.5 degrees to 11.25 degrees.

Paragraph S: The cylindrical metal aerovalve (A) according to Paragraph P, wherein the third angle (A3) ranges from between 11.25 degrees to 90 degrees.

Paragraph T: The cylindrical metal aerovalve (A) according to Paragraph P, wherein the total aerovalve length (L) to first inner diameter (D1) ratio ranges from 2.5 to 10.

Paragraph U: The cylindrical metal aerovalve (A) according to Paragraph P, wherein the total aerovalve length (L) to outer diameter (D0) ratio ranges from 1 to 8.

Paragraph V: The cylindrical metal aerovalve (A) according to Paragraph P, wherein the first inner diameter (D1) to outer diameter (D0) ratio ranges from 1.25 to 3.75.

Paragraph W: The pulse combustion heat exchanger (1000) according to claim 1, wherein the mixing section comprises:

at least one metal aerovalve (A), having an aerovalve longitudinal axis (X1), an outer surface (S) with an outer diameter (D0), an interior (A-IN), a rear end (1E1) having a rearwardly facing rear surface (1E1S), a forward end (2E1) having a forwardly facing forward surface (2E1S), and a total aerovalve length (L) defined between the rear and forward ends (1E1, 2E1) along the aerovalve longitudinal axis (X1).

Paragraph X: A metal aerovalve (A), having an aerovalve longitudinal axis (X1), an outer surface (S) with an outer diameter (D0), an interior (A-IN), a rear end (1E1) having a rearwardly facing rear surface (1E1S), a forward end (2E1) having a forwardly facing forward surface (2E1S), and a total aerovalve length (L) defined between the rear and forward ends (1E1, 2E1) along the aerovalve longitudinal axis (X1), the aerovalve (A) further comprising:

an oxidant inlet (1A0) located at the rear end (1E1), the oxidant inlet (1A0) configured to introduce oxidant (1A1) into the interior (A-IN) of the aerovalve (A);

an oxidant and fuel mixture outlet (2A0) located at the forward end (2E1), the oxidant and fuel mixture outlet (2A0) configured to expel an oxidant and fuel mixture (1A3) present in the interior (A-IN) of the aerovalve (A);

a first plurality of fuel inlet ports (1A, 1B, 1C, $1^N$, $1^{N+1}$) opening to the outer surface (S), a second plurality of fuel outlet ports (2A, 2B, 2C, $2^N$, $2^{N+1}$) opening to the interior (A-IN), and a third plurality of fuel transfer channels (3A, 3B, 3C, $3^N$, $3^{N+1}$) configured to transfer fuel (1A2) from the first plurality of fuel inlet ports (1A, 1B, 1C, $1^N$, $1^{N+1}$) to the second plurality of fuel outlet ports (2A, 2B, 2C, $2^N$, $2^{N+1}$);

a first inner conical surface (S1) tapering radially inwardly at a first angle (A1) to a first inner diameter (D1), the first inner conical surface (S1) extending in the forward direction from proximate the rear end (1E1) for a first length (L1) along the aerovalve longitudinal axis (X1);

a second inner conical surface (S2) expanding radially outwardly at a second angle (A2) to a second inner diameter (D2), the second inner conical surface (S2) extending in the forward direction from proximate the first inner conical surface (S1) for a second length (L2) along the aerovalve longitudinal axis (X1), the second inner diameter (D2) being equal to the outer diameter (D0), and the second length (L2) ending at the total aerovalve length (L);

wherein: the first angle (A1) is greater than the second angle (A2); and the second plurality of fuel outlet ports (2A, 2B, 2C, $2^N$, $2^{N+1}$) are positioned on the second inner conical surface (S2).

Paragraph Y: A metal aerovalve (A), having an aerovalve longitudinal axis (X1), an outer surface (S) with an outer diameter (D0), an interior (A-IN), a rear end (1E1) having a rearwardly facing rear surface (1E1S), a forward end (2E1) having a forwardly facing forward surface (2E1S), and a total aerovalve length (L) defined between the rear and forward ends (1E1, 2E1) along the aerovalve longitudinal axis (X1), the aerovalve (A) further comprising:

an oxidant inlet (1A0) located at the rear end (1E1), the oxidant inlet (1A0) configured to introduce oxidant (1A1) into the interior (A-IN) of the aerovalve (A);

an oxidant and fuel mixture outlet (2A0) located at the forward end (2E1), the oxidant and fuel mixture outlet (2A0) configured to expel an oxidant and fuel mixture (1A3) present in the interior (A-IN) of the aerovalve (A);

a first plurality of fuel inlet ports (1A, 1B, 1C, $1^N$, $1^{N+1}$) opening to the outer surface (S), a second plurality of fuel outlet ports (2A, 2B, 2C, $2^N$, $2^{N+1}$) opening to the interior (A-IN), and a third plurality of fuel transfer channels (3A, 3B, 3C, $3^N$, $3^{N+1}$) configured to transfer fuel (1A2) from the first plurality of fuel inlet ports (1A, 1B, 1C, $1^N$, $1^{N+1}$) to the second plurality of fuel outlet ports (2A, 2B, 2C, $2^N$, $2^{N+1}$);

a first inner conical surface (S1) tapering radially inwardly at a first angle (A1) to a first inner diameter (D1), the first inner conical surface (S1) extending in the forward direction from proximate the rear end (1E1) for a first length (L1) along the aerovalve longitudinal axis (X1);

a second inner conical surface (S2) expanding radially outwardly at a second angle (A2) to a second inner diameter (D2), the second inner conical surface (S2) extending in the forward direction from proximate the first inner conical surface (S1) for a second length (L2) along the aerovalve longitudinal axis (X1), the second inner diameter (D2) being less than the outer diameter (D0), and the second length (L2) ending at the total aerovalve length (L);

wherein: the first angle (A1) is greater than the second angle (A2); and the second plurality of fuel outlet ports (2A, 2B, 2C, $2^N$, $2^{N+1}$) are positioned on the second inner conical surface (S2).

Paragraph Z: A method to form a cooled combustion stream, the method includes:
 (a) providing a pulse combustion heat exchanger having a longitudinal axis that includes:
  (a1) an oxidant inlet section connected to a mixing section, the oxidant inlet section configured to accept oxidant;
  (a2) a fuel inlet section connected to the mixing section, the fuel inlet section configured to accept fuel;
  (a3) a mixing section connected to a combustion section, the mixing section is configured to accept oxidant from the oxidant inlet section and fuel from the fuel inlet section and mix the oxidant with the fuel to form an oxidant and fuel mixture;
  (a4) a combustion section connected to a heat transfer section, the combustion section configured to accept and combust the oxidant and fuel mixture from the mixing section to form a pulsating combustion stream;
  (a5) a heat transfer section connected to a decoupler section, the heat transfer section is configured to accept the pulsating combustion stream from the combustion section and cool the combustion stream by transferring heat to a heat transfer material;
  (a6) a decoupler section configured to acoustically disengage the cooled combustion stream from the heat transfer section;
 (b) introducing oxidant to the oxidant inlet section;
 (c) introducing fuel to the fuel inlet section;
 (d) introducing oxidant from the oxidant inlet section to the mixing section;
 (e) introducing fuel from the fuel inlet section to the mixing section;
 (f) mixing the oxidant of step (d) with the fuel of step (e) to form an oxidant and fuel mixture;
 (g) introducing the oxidant and fuel mixture of step (f) into the combustion section;
 (h) igniting the oxidant and fuel mixture after step (g) to form a pulsating combustion stream;
 (i) introducing the pulsating combustion stream of step (h) into the heat transfer section;
 (j) transferring heat from the pulsating combustion stream after step (i) to a heat transfer medium while cooling a portion of the pulsating combustion stream to form a cooled combustion stream; and
 (k) transferring the cooled combustion stream of step (j) to the decoupler section and acoustically disengaging the cooled combustion stream from the heat transfer section.

Paragraph AA: The method according the Paragraph Z, further comprising:
 (a) providing a first metal surface in between the combustion section and heat transfer section; and
 (b) contacting the first metal surface with a first coolant to cool the first metal surface.

Paragraph AB: The method according the Paragraph Z, wherein the first coolant is water and heat is removed from the first metal surface to generate a first steam.

Paragraph AC: The method according the Paragraph AB, further comprising:
 (a) providing a coolant recycling drum having coolant contained therein and having a drum outlet in fluid communication with the first metal surface and further having drum inlet configured to accept the first steam;
 (b) transferring coolant from the coolant recycling drum to contact the first metal surface;
 (c) generating a first steam; and
 (d) transferring the first steam to the drum inlet of the coolant recycling drum.

Paragraph AD: The method according the Paragraph AC, further comprising:
 (a) providing a first restriction orifice positioned between the drum outlet and the first metal surface;
 (b) prior to contacting the first metal surface with the coolant, reducing the pressure of the coolant by passing the coolant through the first restriction orifice.

Paragraph AE: The method according the Paragraph AD, further comprising:
 (a) providing a recycling pump in between the drum outlet and the first metal surface, the recycling pump is configured to supply coolant under pressure to the first metal surface;
 (b) pressurizing the coolant; and
 (c) passing the pressurized coolant through the first restriction orifice.

Paragraph AF: The method according the Paragraph Z, further comprising:
 (a) providing a second metal surface in between the heat transfer section and decoupler section;
 (b) contacting the second metal surface with a second coolant to cool the second metal surface.

Paragraph AG: The method according the Paragraph AF, wherein the second coolant is water and heat is removed from the second metal surface to generate a second steam.

Paragraph AH: The method according the Paragraph AG, further comprising:
 (a) providing a coolant recycling drum having coolant contained therein and having a drum outlet in fluid communication with the second metal surface and further having drum inlet configured to accept the second steam;
 (b) transferring coolant from the coolant recycling drum to contact the second metal surface;
 (c) generating a second steam; and
 (d) transferring the second steam to the drum inlet of the coolant recycling drum.

Paragraph AI: The method according the Paragraph AH, further comprising:
 (a) providing a second restriction orifice positioned between the drum outlet and the second metal surface;
 (b) prior to contacting the second metal surface with the coolant, reducing the pressure of the coolant by passing the coolant through the second restriction orifice.

Paragraph AJ: The method according the Paragraph AI, further comprising:
 (a) providing a recycling pump in between the drum outlet and the second metal surface, the recycling pump is configured to supply coolant under pressure to the second metal surface;
 (b) pressurizing the coolant; and
 (c) passing the pressurized coolant through the second restriction orifice.

Paragraph AK: The method according the Paragraph Z, further comprising:
 (a) providing a third metal surface in between the mixing section and combustion section;
 (b) contacting the third metal surface with a third coolant to cool the third metal surface.

Paragraph AL: The method according the Paragraph AK, wherein the third coolant is water and heat is removed from the third metal surface to generate a third steam.

Paragraph AM: The method according the Paragraph AL, further comprising:
(a) providing a coolant recycling drum having coolant contained therein and having a drum outlet in fluid communication with the third metal surface and further having drum inlet configured to accept the third steam;
(b) transferring coolant from the coolant recycling drum to contact the third metal surface;
(c) generating a third steam; and
(d) transferring the third steam to the drum inlet of the coolant recycling drum.

Paragraph AN: The method according the Paragraph AM, further comprising:
(a) providing a third restriction orifice positioned between the drum outlet and the third metal surface;
(b) prior to contacting the third metal surface with the coolant, reducing the pressure of the coolant by passing the coolant through the third restriction orifice.

Paragraph AO: The method according the Paragraph AN, further comprising:
(a) providing a recycling pump in between the drum outlet and the third metal surface, the recycling pump is configured to supply coolant under pressure to the third metal surface;
(b) pressurizing the coolant; and
(c) passing the pressurized coolant through the third restriction orifice.

Paragraph AP: The method according to Paragraph Z, further comprising:
(a) providing a plurality of aerovalves within the mixing section, the aerovalves have a converging-diverging geometry and are configured to provide turbulent mixing of the oxidant and fuel within the mixing section and minimize backflow of the oxidant and fuel mixture from the mixing section into the oxidant inlet section or fuel inlet section;
(b) subjecting the oxidant to a first drop in pressure from the oxidant inlet section to the mixing section; and
(c) subjecting the fuel to a second drop in pressure from the fuel inlet section to the mixing section.

Paragraph AQ: The method according the Paragraph Z, further comprising:
(a) providing plurality of ignitors in fluid communication with the combustion section, each ignitor having an ignitor input configured to introduce an ignitor mixture to the ignitor, the ignitor input being in fluid communication with an ignitor oxidant supply and an ignitor fuel supply;
(b) introducing an ignitor mixture to each of the plurality of ignitors;
(c) igniting the oxidant and fuel mixture within the combustion section with the plurality of ignitors.

BRIEF DESCRIPTION OF THE DRAWINGS

The accompanying figures show schematic process flowcharts of preferred embodiments and variations thereof. A full and enabling disclosure of the content of the accompanying claims, including the best mode thereof to one of ordinary skill in the art, is set forth more particularly in the remainder of the specification, including reference to the accompanying figures showing how the preferred embodiments and other non-limiting variations of other embodiments described herein may be carried out in practice, in which:

FIG. 22 discloses a method to form a cooled combustion stream.

DETAILED DESCRIPTION

Reference will now be made in detail to various embodiments of the disclosure. Each embodiment is provided by way of explanation of the disclosure, not limitation of the disclosure. In fact, it will be apparent to those skilled in the art that modifications and variations can be made in the disclosure without departing from the teaching and scope thereof. For instance, features illustrated or described as part of one embodiment to yield a still further embodiment derived from the teaching of the disclosure. Thus, it is intended that the disclosure or content of the claims cover such derivative modifications and variations to come within the scope of the disclosure or claimed embodiments described herein and their equivalents.

Additional objects and advantages of the disclosure will be set forth in part in the description which follows, and in part will be obvious from the description, or may be learned by practice of the claims. The objects and advantages of the disclosure will be attained by means of the instrumentalities and combinations and variations particularly pointed out in the appended claims.

FIG. 1

Figure 1:
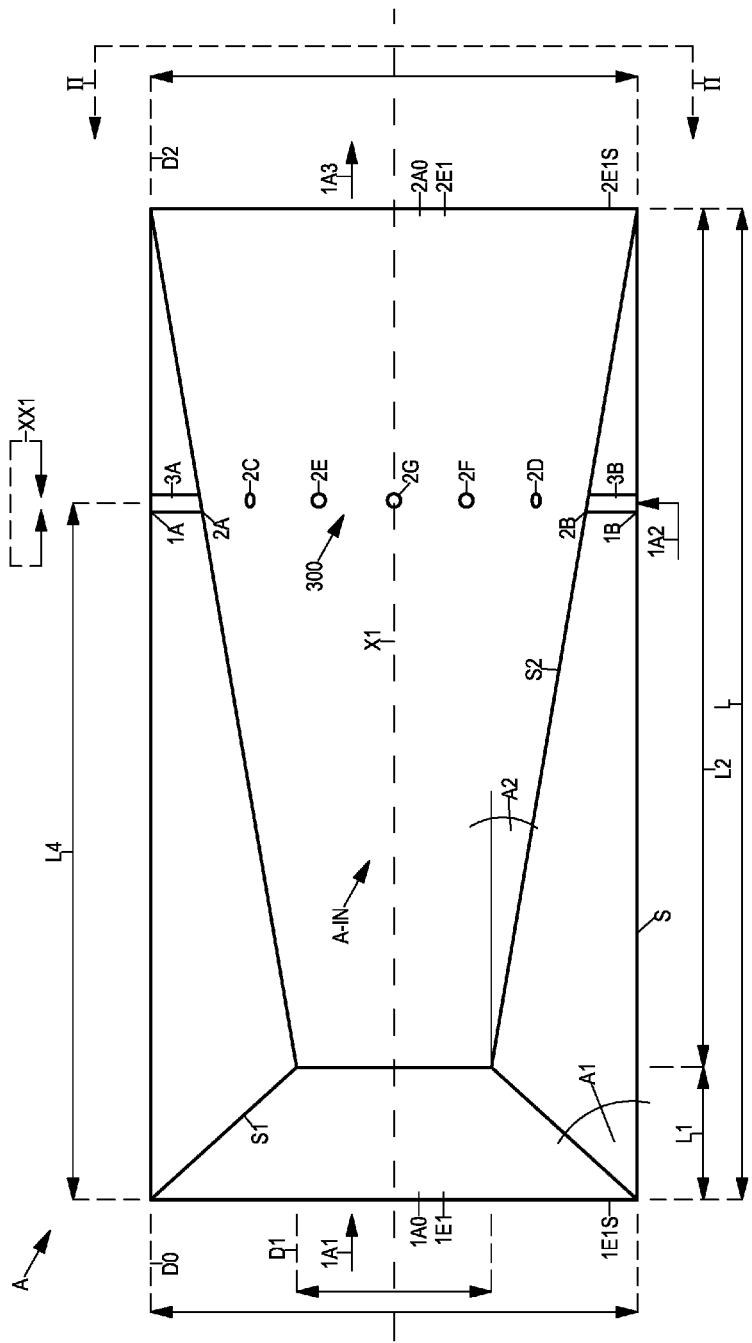
FIG. 1 depicts a first embodiment of an aerovalve (A) that has two inner conical surfaces (S1, S2) and viewed from a first side cross-sectional view (I-I).

FIG. 1 depicts a first embodiment of an aerovalve (A) that has two inner conical surfaces (S1, S2) and viewed from a first side cross-sectional view (I-I).

FIG. 1 discloses a metal aerovalve (A), having an aerovalve longitudinal axis (X1), an outer surface (S) with an outer diameter (D0), an interior (A-IN), a rear end (1E1) having a rearwardly facing rear surface (1E1S), a forward end (2E1) having a forwardly facing forward surface (2E1S), and a total aerovalve length (L) defined between the rear and forward ends (1E1, 2E1) along the aerovalve longitudinal axis (X1), the aerovalve (A) further comprising:

an oxidant inlet (1A0) located at the rear end (1E1), the oxidant inlet (1A0) configured to introduce oxidant (1A1) into the interior (A-IN) of the aerovalve (A);

an oxidant and fuel mixture outlet (2A0) located at the forward end (2E1), the oxidant and fuel mixture outlet (2A0) configured to expel an oxidant and fuel mixture (1A3) present in the interior (A-IN) of the aerovalve (A);

a first plurality of fuel inlet ports (1A, 1B, $1^N$, $1^{N+1}$) opening to the outer surface (S), a second plurality of fuel outlet ports (2A, 2B, 2C, 2D, 2E, 2F, 2G, $2^N$, $2^{N+1}$) opening to the interior (A-IN), and a third plurality of fuel transfer channels (3A, 3B, $3^N$, $3^{N+1}$) configured to transfer fuel (1A2) from the first plurality of fuel inlet ports (1A, 1B, $1^N$, $1^{N+1}$) to the second plurality of fuel outlet ports (2A, 2B, 2C, 2D, 2E, 2F, 2G, $2^N$, $2^{N+1}$);

a first inner conical surface (S1) tapering radially inwardly at a first angle (A1) to a first inner diameter (D1), the first inner conical surface (S1) extending in the forward direction from proximate the rear end (1E1) for a first length (L1) along the aerovalve longitudinal axis (X1);

a second inner conical surface (S2) expanding radially outwardly at a second angle (A2) to a second inner diameter (D2), the second inner conical surface (S2) extending in the forward direction from proximate the first inner conical surface (S1) for a second length (L2)

along the aerovalve longitudinal axis (X1), the second inner diameter (D2) being equal to the outer diameter (D0), and the second length (L2) ending at the total aerovalve length (L).

FIG. 1 shows the first angle (A1) greater than the second angle (A2) and the second plurality of fuel outlet ports (2A, 2B, 2C, 2D, 2E, 2F, 2G, $2^N$, $2^{N+1}$) are positioned on the second inner conical surface (S2).

FIG. 1 also shows that the first plurality of fuel inlet ports (1A, 1B, $1^N$, $1^{N+1}$) and a second plurality of fuel outlet ports (2A, 2B, 2C, 2E, 2F, 2G, $2^N$, $2^{N+1}$) both located at a fourth length (L4) that is positioned extending in the forward direction from proximate the rear end (1E1) along the aerovalve longitudinal axis (X1). The fuel transfer channels (3A, 3B, $3^N$, $3^{N+1}$) have a channel diameter (XX1) and are configured to transfer fuel from the first plurality of fuel inlet ports (1A, 1B, $1^N$, $1^{N+1}$) to the second plurality of fuel outlet ports (2A, 2B, 2C, 2E, 2F, 2G, $2^N$, $2^{N+1}$). The interior (A-IN) of the aerovalve (A) may be considered as a mixing section (300).

In embodiments, the first angle (A1) ranges from between 30 degrees to 60 degrees. In embodiments, the second angle (A2) ranges from between 1.5 degrees to 11.25 degrees. In embodiments, the total aerovalve length (L) to first inner diameter (D1) ratio ranges from 2.5 to 10. In embodiments, the total aerovalve length (L) to outer diameter (D0) ratio ranges from 1 to 8. In embodiments, the first inner diameter (D1) to outer diameter (D0) ratio ranges from 1.25 to 3.75.

FIG. 2

Figure 2:
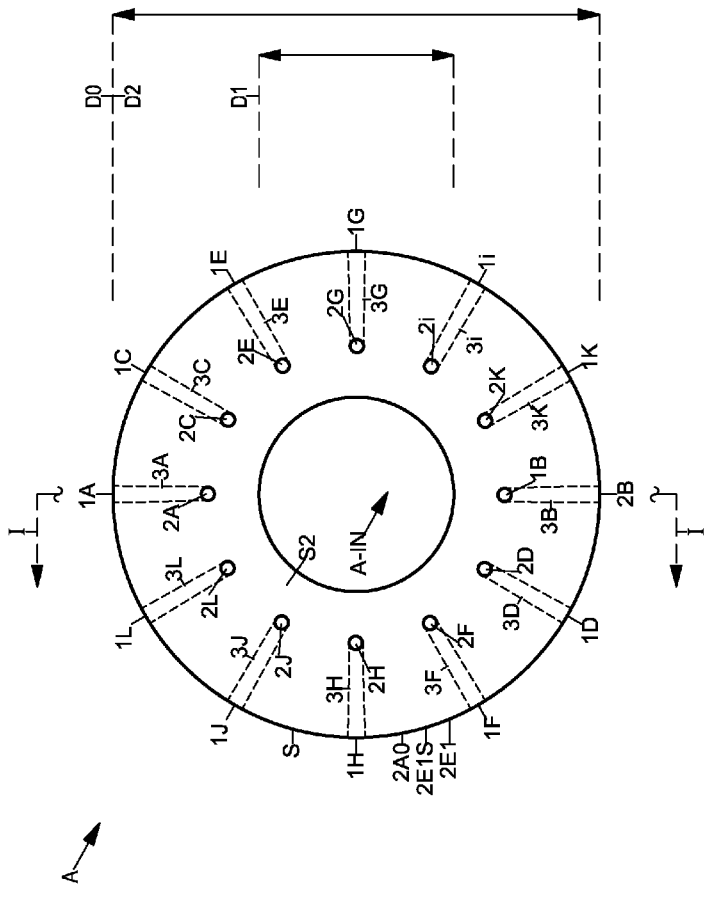
FIG. 2 depicts the first embodiment of the aerovalve (A) as shown in FIG. 1 but viewed from a first forward view (II-II) from the forwardly facing forward surface (2E1S).

FIG. 2 depicts the first embodiment of the aerovalve (A) as shown in FIG. 1 but viewed from a first forward view (II-II) from the forwardly facing forward surface (2E1S).

The first forward view (II-II) of FIG. 2 views the aerovalve (A) from the forwardly facing forward surface (2E1S). The second inner conical surface (S2) is visible in FIG. 2 since the aerovalve (A) is depicted from the oxidant and fuel mixture outlet (2A0) at the forward end (2E1).

FIG. 2 shows a plurality of fuel inlet ports (1A, 1B, 1C, 1D, 1E, 1F, 1G, 1H, 1I, 1J, 1K, 1L) opening to the outer surface (S), a second plurality of fuel outlet ports (2A, 2B, 2C, 2D, 2E, 2F, 2G, 2H, 2I, 2J, 2K, 2L) opening to the interior (A-IN), and a third plurality of fuel transfer channels (3A, 3B, 3C, 3D, 3E, 3F, 3G, 3H, 3I, 3J, 3K, 3L) configured to transfer fuel (1A2) from the first plurality of fuel inlet ports (1A, 1B, 1C, 1D, 1E, 1F, 1G, 1H, 1I, 1J, 1K, 1L) to the second plurality of fuel outlet ports (2A, 2B, 2C, 2D, 2E, 2F, 2G, 2H, 2I, 2J, 2K, 2L).

FIG. 2 also shows the second inner conical surface (S2) expanding radially outward from the first inner diameter (D1) to the second inner diameter (D2). FIG. 2 shows the second inner diameter (D2) equal to the outer diameter (D0).

FIG. 3

Figure 3:
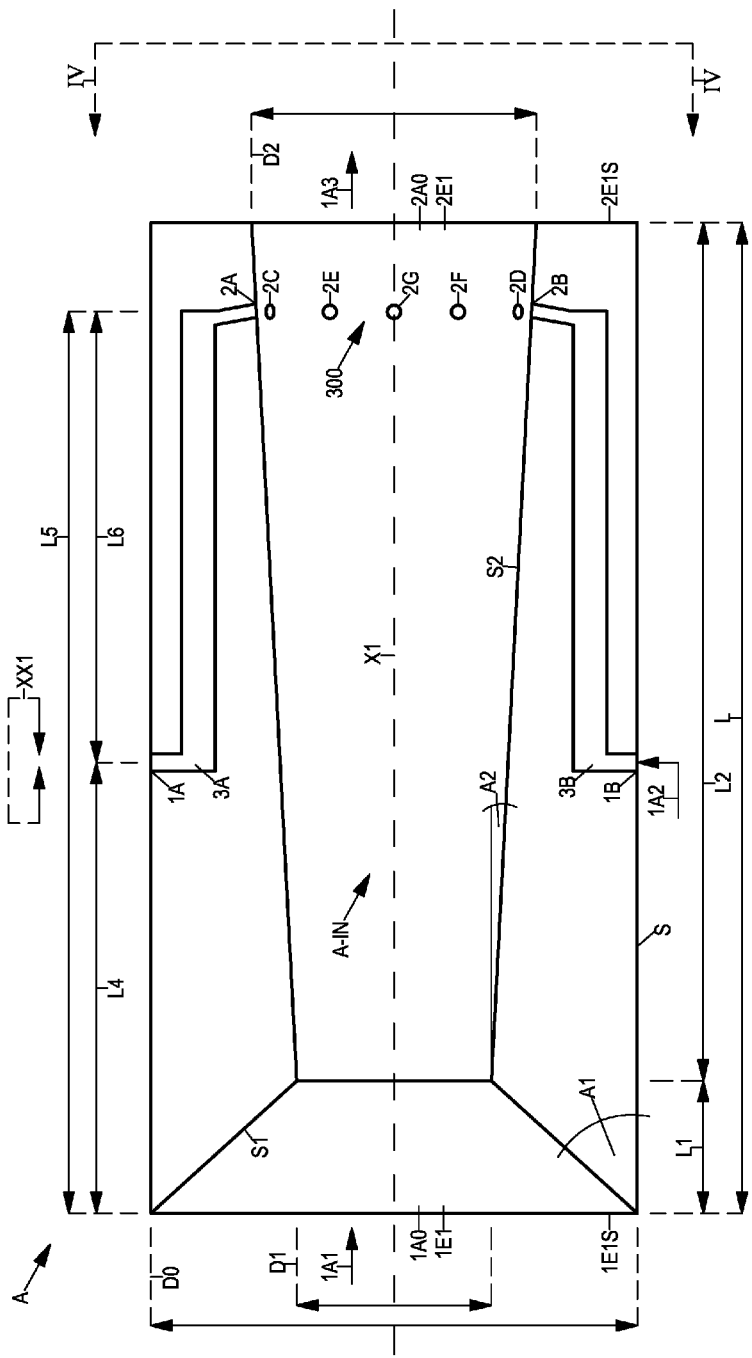
FIG. 3 depicts a second embodiment of an aerovalve (A) that has two inner conical surfaces (S1, S2) and viewed from a second side cross-sectional view (III-III).

FIG. 3 depicts a second embodiment of an aerovalve (A) that has two inner conical surfaces (S1, S2) and viewed from a second side cross-sectional view (III-III).

FIG. 3 discloses a metal aerovalve (A), having an aerovalve longitudinal axis (X1), an outer surface (S) with an outer diameter (D0), an interior (A-IN), a rear end (1E1) having a rearwardly facing rear surface (1E1S), a forward end (2E1) having a forwardly facing forward surface (2E1S), and a total aerovalve length (L) defined between the rear and forward ends (1E1, 2E1) along the aerovalve longitudinal axis (X1), the aerovalve (A) further comprising:

an oxidant inlet (1A0) located at the rear end (1E1), the oxidant inlet (GAO) configured to introduce oxidant (1A1) into the interior (A-IN) of the aerovalve (A);

an oxidant and fuel mixture outlet (2A0) located at the forward end (2E1), the oxidant and fuel mixture outlet (2A0) configured to expel an oxidant and fuel mixture (1A3) present in the interior (A-IN) of the aerovalve (A);

a first plurality of fuel inlet ports (1A, 1B, $1^N$, $1^{N+1}$) opening to the outer surface (S), a second plurality of fuel outlet ports (2A, 2B, 2C, 2D, 2E, 2F, 2G, $2^N$, $2^{N+1}$)) opening to the interior (A-IN), and a third plurality of fuel transfer channels (3A, 3B, $3^N$, $3^{N+1}$) configured to transfer fuel (1A2) from the first plurality of fuel inlet ports (1A, 1B, 1C, $1^N$, $1^{N+1}$) to the second plurality of fuel outlet ports (2A, 2B, 2C, 2D, 2E, 2F, 2G, $2^N$, $2^{N+1}$);

a first inner conical surface (S1) tapering radially inwardly at a first angle (A1) to a first inner diameter (D1), the first inner conical surface (S1) extending in the forward direction from proximate the rear end (1E1) for a first length (L1) along the aerovalve longitudinal axis (X1);

a second inner conical surface (S2) expanding radially outwardly at a second angle (A2) to a second inner diameter (D2), the second inner conical surface (S2) extending in the forward direction from proximate the first inner conical surface (S1) for a second length (L2) along the aerovalve longitudinal axis (X1), the second inner diameter (D2) being less than the outer diameter (D0), and the second length (L2) ending at the total aerovalve length (L).

The first angle (A1) is greater than the second angle (A2) and the second plurality of fuel outlet ports (2A, 2B, 2C, $2^N$, $2^{N+1}$) are positioned on the second inner conical surface (S2). In embodiments, the first angle (A1) ranges from between 30 degrees to 60 degrees. In embodiments, the second angle (A2) ranges from between 1.5 degrees to 11.25 degrees. In embodiments, the total aerovalve length (L) to first inner diameter (D1) ratio ranges from 2.5 to 10. In embodiments, the total aerovalve length (L) to outer diameter (D0) ratio ranges from 1 to 8. In embodiments, the first inner diameter (D1) to outer diameter (D0) ratio ranges from 1.25 to 3.75.

FIG. 3 also shows the first plurality of fuel inlet ports (1A, 1B, $1^N$, $1^{N+1}$) located at a fourth length (L4) that is positioned extending in the forward direction from proximate the rear end (1E1) along the aerovalve longitudinal axis (X1). FIG. 3 also shows that second plurality of fuel outlet ports (2A, 2B, 2C, 2E, 2F, 2G, $2^N$, $2^{N+1}$) located at a fifth length (L5) that is positioned extending in the forward direction from proximate the rear end (1E1) along the aerovalve longitudinal axis (X1). The fuel transfer channels (3A, 3B, $3^N$, $3^{N+1}$) have a channel diameter (XX1) and sixth length (L6) that is the difference between the fourth length (L4) and fifth length (L5). The interior (A-IN) of the aerovalve (A) may be considered as a mixing section (300).

FIG. 4

Figure 4:
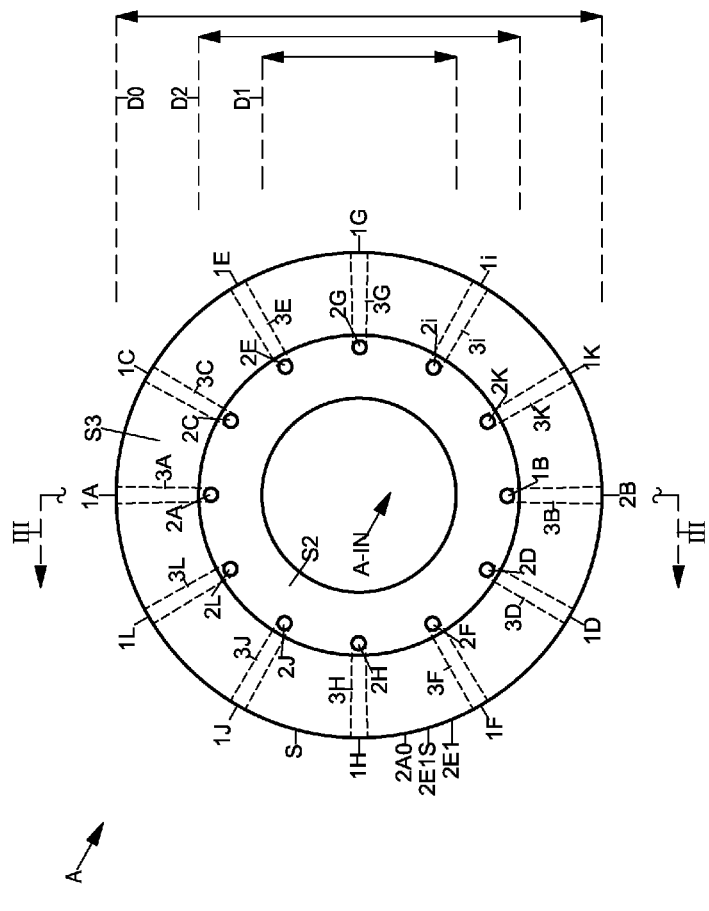
FIG. 4 depicts the second embodiment of the aerovalve (A) as shown in FIG. 3 but viewed from a second forward view (IV-IV) from the forwardly facing forward surface (2E1S).

FIG. 4 depicts the second embodiment of the aerovalve (A) as shown in FIG. 3 but viewed from a second forward view (IV-IV) from the forwardly facing forward surface (2E1S).

The second forward view (IV-IV) of FIG. 4 views the aerovalve (A) from the forwardly facing forward surface (2E1S). The second inner conical surface (S2) is visible in FIG. 4 since the aerovalve (A) is depicted from the oxidant and fuel mixture outlet (2A0) at the forward end (2E1).

FIG. 4 shows a plurality of fuel inlet ports (1A, 1B, 1C, 1D, 1E, 1F, 1G, 1H, 1I, 1J, 1K, 1L) opening to the outer surface (S), a second plurality of fuel outlet ports (2A, 2B, 2C, 2D, 2E, 2F, 2G, 2H, 2I, 2J, 2K, 2L) opening to the interior (A-IN), and a third plurality of fuel transfer channels (3A, 3B, 3C, 3D, 3E, 3F, 3G, 3H, 3I, 3J, 3K, 3L) configured to transfer fuel (1A2) from the first plurality of fuel inlet ports (1A, 1B, 1C, 1D, 1E, 1F, 1G, 1H, 1I, 1J, 1K, 1L) to the second plurality of fuel outlet ports (2A, 2B, 2C, 2D, 2E, 2F, 2G, 2H, 2I, 2J, 2K, 2L).

FIG. 4 also shows the second inner conical surface (S2) expanding radially outwardly from the first inner diameter (D1) to the second inner diameter (D2). FIG. 4 shows the second inner diameter (D2) less than the outer diameter (D0).

FIG. 5

Figure 5:
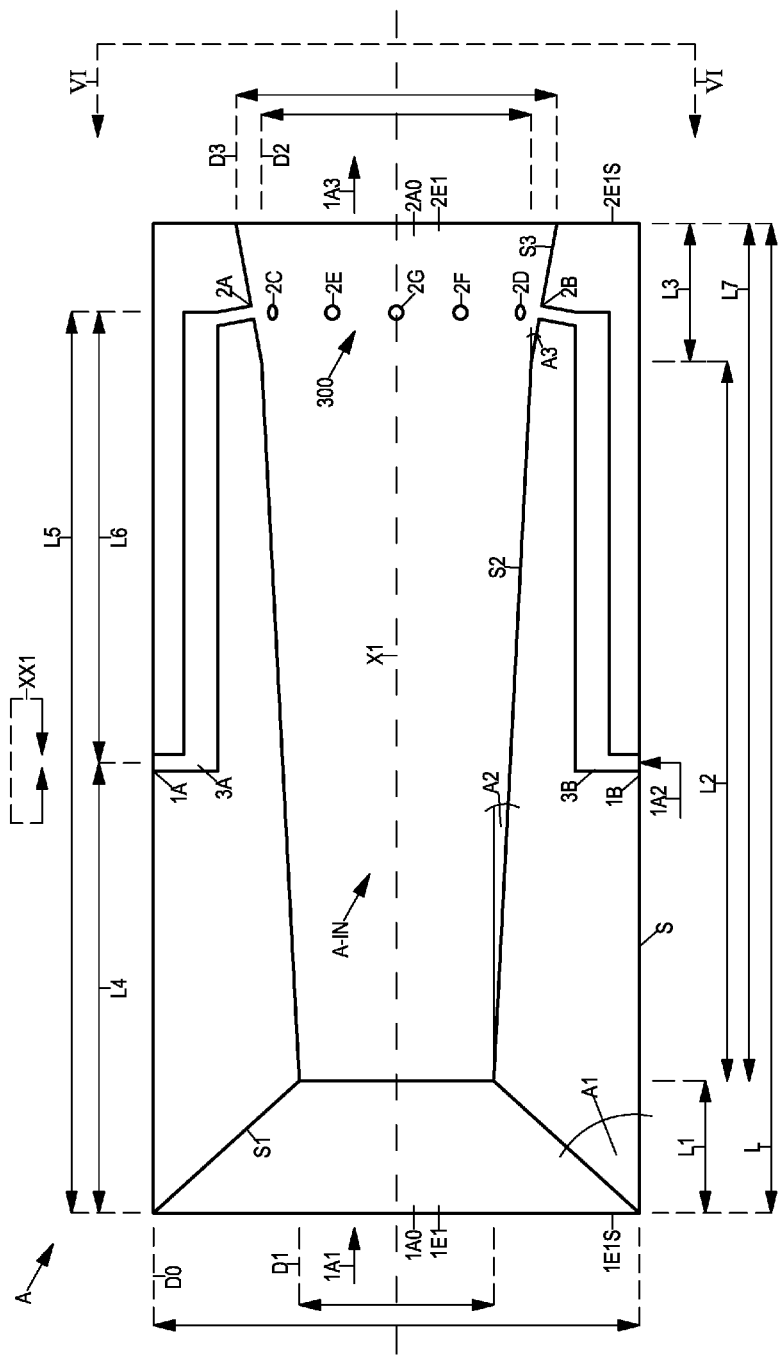
FIG. 5 depicts a third embodiment of an aerovalve (A) that has three inner conical surfaces (S1, S2, S3) and viewed from a third side cross-sectional view (V-V).

FIG. 5 depicts a third embodiment of an aerovalve (A) that has three inner conical surfaces (S1, S2, S3) and viewed from a third side cross-sectional view (V-V).

FIG. 5 discloses a metal aerovalve (A), having an aerovalve longitudinal axis (X1), an outer surface (S) with an outer diameter (D0), an interior (A-IN), a rear end (1E1) having a rearwardly facing rear surface (1E1S), a forward end (2E1) having a forwardly facing forward surface (2E1S), and a total aerovalve length (L) defined between the rear and forward ends (1E1, 2E1) along the aerovalve longitudinal axis (X1), the aerovalve (A) further comprising:
- an oxidant inlet (1A0) located at the rear end (1E1), the oxidant inlet (1A0) configured to introduce oxidant (1A1) into the interior (A-IN) of the aerovalve (A);
- an oxidant and fuel mixture outlet (2A0) located at the forward end (2E1), the oxidant and fuel mixture outlet (2A0) configured to expel an oxidant and fuel mixture (1A3) present in the interior (A-IN) of the aerovalve (A);
- a first plurality of fuel inlet ports (1A, 1B, $1^N$, $1^{N+1}$) opening to the outer surface (S), a second plurality of fuel outlet ports (2A, 2B, 2C, 2D, 2E, 2F, 2G, $2^N$, $2^{N+1}$) opening to the interior (A-IN), and a third plurality of fuel transfer channels (3A, 3B, $3^N$, $3^{N+1}$) configured to transfer fuel (1A2) from the first plurality of fuel inlet ports (1A, 1B, $1^N$, $1^{N+1}$) to the second plurality of fuel outlet ports (2A, 2B, 2C, 2D, 2E, 2F, 2G, $2^N$, $2^N$);
- a first inner conical surface (S1) tapering radially inwardly at a first angle (A1) to a first inner diameter (D1), the first inner conical surface (S1) extending in the forward direction from proximate the rear end (1E1) for a first length (L1) along the aerovalve longitudinal axis (X1);
- a second inner conical surface (S2) expanding radially outwardly at a second angle (A2) to a second inner diameter (D2), the second inner conical surface (S2) extending in the forward direction from proximate the first inner conical surface (S1) for a second length (L2) along the aerovalve longitudinal axis (X1), the second inner diameter (D2) being less than the outer diameter (D0); and
- a third inner conical surface (S3) expanding radially outwardly at a third angle (A3) to a third inner diameter (D3), the third inner conical surface (S3) extending in the forward direction from proximate the second inner conical surface (S2) for a third length (L3) along the aerovalve longitudinal axis (X1), the third inner diameter (D3) being greater than the first and second inner diameters (D1, D2) and less than the outer diameter (D0);

The first angle (A1) is greater than the second angle (A2), the third angle (A3) is greater than the second angle (A2), and the second plurality of fuel outlet ports (2A, 2B, 2C, $2^N$, $2^{N+1}$) are positioned on the third inner conical surface (S3).

FIG. 5 also shows the first plurality of fuel inlet ports (1A, 1B, $1^N$, $1^{N+1}$) located at a fourth length (L4) that is positioned extending in the forward direction from proximate the rear end (1E1) along the aerovalve longitudinal axis (X1). FIG. 5 also shows that second plurality of fuel outlet ports (2A, 2B, 2C, 2E, 2F, 2G, $2^N$, $2^{N+1}$) located at a fifth length (L5) that is positioned extending in the forward direction from proximate the rear end (1E1) along the aerovalve longitudinal axis (X1). The fuel transfer channels (3A, 3B, $3^N$, $3^{N+1}$) have a channel diameter (XX1) and sixth length (L6) that is the difference between the fourth length (L4) and fifth length (L5). The interior (A-IN) of the aerovalve (A) may be considered as a mixing section (300).

In embodiments, the first angle (A1) ranges from between 30 degrees to 60 degrees. In embodiments, the second angle (A2) ranges from between 1.5 degrees to 11.25 degrees. In embodiments, the third angle (A3) ranges from between 11.25 degrees to 90 degrees. In embodiments, the total aerovalve length (L) to first inner diameter (D1) ratio ranges from 2.5 to 10. In embodiments, the total aerovalve length (L) to outer diameter (D0) ratio ranges from 1 to 8. In embodiments, the first inner diameter (D1) to outer diameter (D0) ratio ranges from 1.25 to 3.75.

FIG. 6

Figure 6:
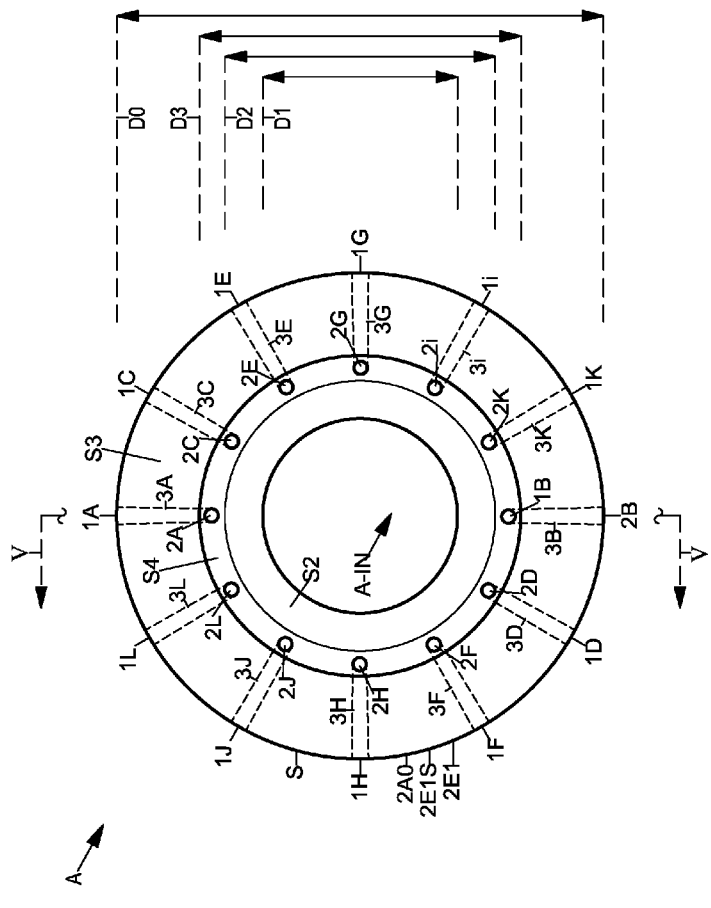
FIG. 6 depicts the third embodiment of the aerovalve (A) as shown in FIG. 5 but viewed from a third forward view (VI-VI) from the forwardly facing forward surface (2E1S).

FIG. 6 depicts the third embodiment of the aerovalve (A) as shown in FIG. 5 but viewed from a third forward view (VI-VI) from the forwardly facing forward surface (2E1S).

The third forward view (VI-VI) of FIG. 6 views the aerovalve (A) from the forwardly facing forward surface (2E1S). The second inner conical surface (S2) and third inner conical surface (S3) are both visible in FIG. 6 since the aerovalve (A) is depicted from the oxidant and fuel mixture outlet (2A0) at the forward end (2E1).

FIG. 6 shows a plurality of fuel inlet ports (1A, 1B, 1C, 1D, 1E, 1F, 1G, 1H, 1I, 1J, 1K, 1L) opening to the outer surface (S), a second plurality of fuel outlet ports (2A, 2B, 2C, 2D, 2E, 2F, 2G, 2H, 2I, 2J, 2K, 2L) opening to the interior (A-IN), and a third plurality of fuel transfer channels (3A, 3B, 3C, 3D, 3E, 3F, 3G, 3H, 3I, 3J, 3K, 3L) configured to transfer fuel (1A2) from the first plurality of fuel inlet ports (1A, 1B, 1C, 1D, 1E, 1F, 1G, 1H, 1I, 1J, 1K, 1L) to the second plurality of fuel outlet ports (2A, 2B, 2C, 2D, 2E, 2F, 2G, 2H, 2I, 2J, 2K, 2L).

FIG. 6 also shows the second inner conical surface (S2) expanding radially outwardly from the first inner diameter (D1) to the second inner diameter (D2) and the third inner conical surface (S3) expanding radially outwardly to a third inner diameter (D3). FIG. 6 shows the third inner diameter (D3) less than the outer diameter (D0).

FIG. 7

Figure 7:
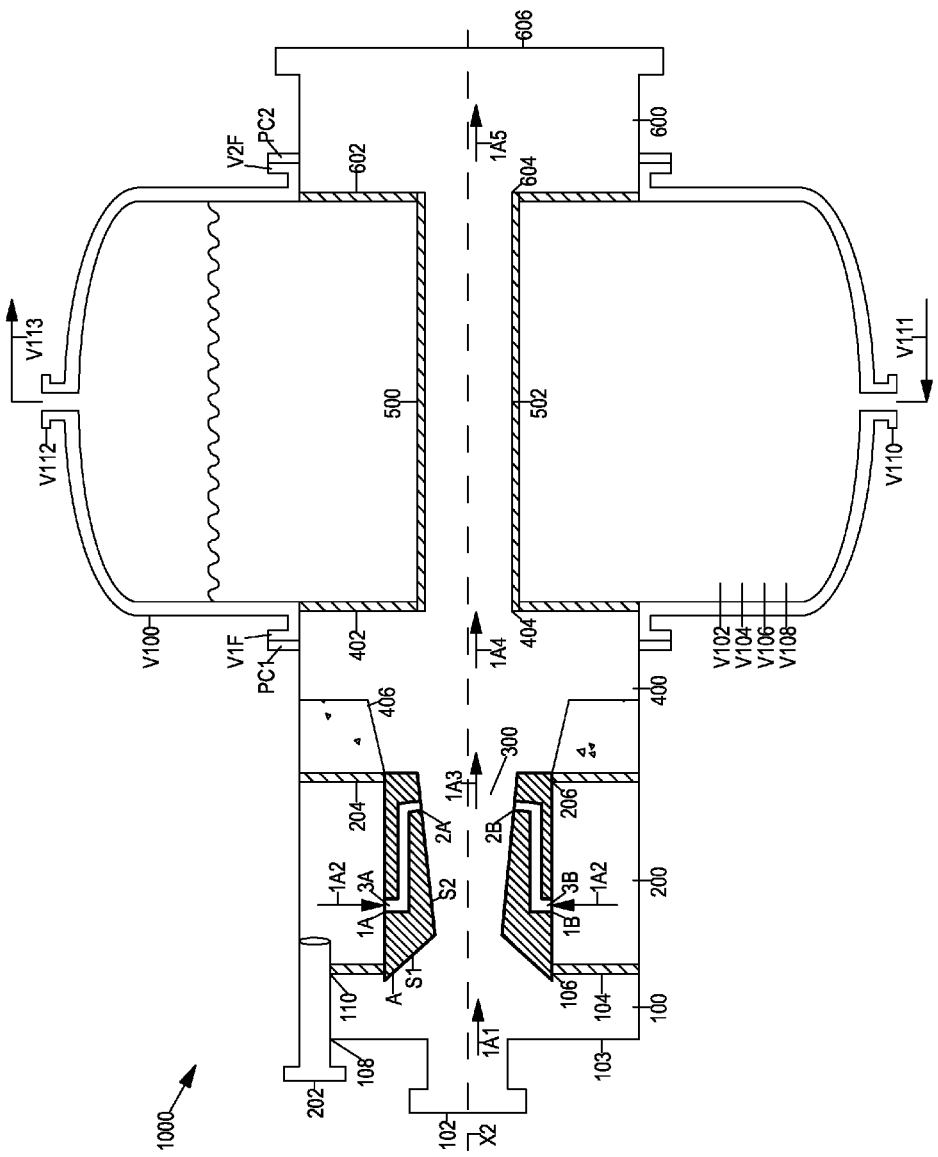
FIG. 7 depicts one non-limiting embodiment of a pulse combustion heat exchanger (1000) that is configured to accept oxidant (1A1) and fuel (1A2) and output a cooled combustion stream (1A5), including: (a) an oxidant inlet section (100); (b) a fuel inlet section (200); (c) a mixing section (300); (d) a combustion section (400); (e) a heat transfer section (500); and (f) a decoupler section (600), wherein the heat transfer section (500) is configured to transfer heat to an energy sink (V108).

FIG. 7 depicts one non-limiting embodiment of a pulse combustion heat exchanger (1000) that is configured to accept oxidant (1A1) and fuel (1A2) and output a cooled combustion stream (1A5), including: (a) an oxidant inlet section (100); (b) a fuel inlet section (200); (c) a mixing section (300); (d) a combustion section (400); (e) a heat transfer section (500); and (f) a decoupler section (600), wherein the heat transfer section (500) is configured to transfer heat to an energy sink (V108).

FIG. 7 depicts a one non-limiting embodiment of a pulse combustion heat exchanger (1000) having an exchanger longitudinal axis (X2) that is configured to accept oxidant (1A1) and fuel (1A2) and output a cooled combustion stream (1A5). The pulse combustion heat exchanger (1000) of FIG. 7 has an oxidant inlet section (100) that is configured to accept oxidant (1A1), a fuel inlet section (200) that is configured to accept fuel (1A2), a mixing section (300)

including one aerovalve (A) that is configured to accept and mix oxidant (1A1) from the oxidant inlet section (100) with fuel (1A2) from the fuel inlet section (200) to create an oxidant and fuel mixture (1A3), a combustion section (400) configured to receive and combust the oxidant and fuel mixture (1A3) from the mixing section (300) to produce a pulsating combustion stream (1A4), a heat transfer section (500) configured to receive the combustion stream (1A4) from the combustion section (400), the heat transfer section (500) including one resonance conduit (502) that is configured to transfer heat from the combustion stream (1A4) to an energy sink (V108), and a decoupler section (600) connected to the heat transfer section (500) and configured to accept a cooled combustion stream (1A5) from the heat transfer section (500) and output the cooled combustion stream (1A5) via a combustion stream outlet (606). In embodiments, combustion of the oxidant and fuel mixture (1A3) may continue to take place within the heat transfer section (500). In embodiments, at least a portion of the pulsating combustion stream (1A4) is cooled in the heat transfer section (500) to form a cooled combustion stream (1A5).

In embodiments, the vessel (V100) has an interior (V102) defined by at least one side wall (V104) with a heat transfer medium (V106) contained within the interior (V102). In embodiments, the heat transfer medium (V106) serves as an energy sink (V108). In embodiments, the heat transfer medium (V106) may be a solid, liquid, or gas or mixtures thereof. In embodiments, the heat transfer medium (V106) may include particulates.

In embodiments, the vessel (V100) is equipped with an inlet (V110) and an outlet (V112). In embodiments, the inlet (V110) has a mass input (V111) for accepting a substance such as a solid, liquid, or gas to the interior (V102) of the vessel (V100). In embodiments, the outlet (V112) has a mass output (V113) that is configured to discharge a substance such as a solid, liquid, or gas from the interior (V102) of the vessel (V100).

FIG. 7 also depicts one non-limiting embodiment of a vessel (V100) equipped with a pulse combustion heat exchanger (1000). The pulse combustion heat exchanger (1000) has a first flange (PC1A) that is connected to a first vessel flange (V1F) and a second flange (PC2A) that is connected to a second vessel flange (V2F).

Oxidant (1A1) is introduced into the oxidant inlet section (100) via an oxidant inlet (102). The oxidant inlet section (100) has an interior that is defined by a first plate (103) and a second plate (104). The oxidant inlet (102) is interposed in the first plate (103) and is configured to transfer oxidant (1A1) into the interior of the oxidant inlet section (100). Oxidant (1A1) is transferred from the oxidant inlet section (100) into the aerovalve (A) via an aerovalve aperture (106). Oxidant (1A1) is mixed with fuel (1A2) within the interior of the aerovalve (A) to form an oxidant and fuel mixture (1A3).

Fuel (1A2) is transferred into the fuel inlet section (200) via a fuel inlet (202). The fuel inlet (202) passes through the first plate (103) of the oxidant inlet section (100) via a first fuel aperture (108) and then through the second plate (104) of the oxidant inlet section (100) into the fuel inlet section (200) via a second fuel aperture (110). The fuel inlet section (200) has an interior that is defined by the second plate (104) and the third plate (204).

The oxidant (1A1) and fuel (1A2) mix within the mixing section (300) within the aerovalve (A) and form an oxidant and fuel mixture (1A3). The oxidant and fuel mixture (1A3) is transferred from the mixing section (300) into the combustion section (400) where it is ignited to form a pulsating combustion stream (1A4). In embodiments, the oxidant and fuel mixture (1A3) is ignited in the mixing section (300) to form a pulsating combustion stream (1A4).

The combustion section (400) has an interior that is defined by the third plate (204) and a fourth plate (402). The fourth plate has an aperture (404) within it that one resonance conduit (502) is shown inserted into. The combustion section (400) has a first refractory section (406) that is positioned within the interior of the combustion section (400) and connected to the third plate (204).

The resonance conduit (502) defines the heat transfer section (500). The heat transfer section (500) is connected to the decoupler section (600). The decoupler section (600) has an interior that is defined by a fifth plate (602) and a combustion stream outlet (606). The fifth plate (602) has an aperture (604) within it that the resonance conduit (502) is inserted into. Heat from the combustion stream (1A4) is transferred through the wall of the resonance conduit (502) into the heat transfer medium (V106) within the interior (V102) of the vessel (V100).

In embodiments, the decoupler section (600) accepts a cooled combustion stream (1A5) from the heat transfer section (500). The cooled combustion stream (1A5) is evacuated from the decoupler section (600) via a combustion stream outlet (606). The decoupler section (600) is configured to acoustically disengage the cooled combustion stream (1A5) from the heat transfer section (500).

FIG. 8

Figure 8:
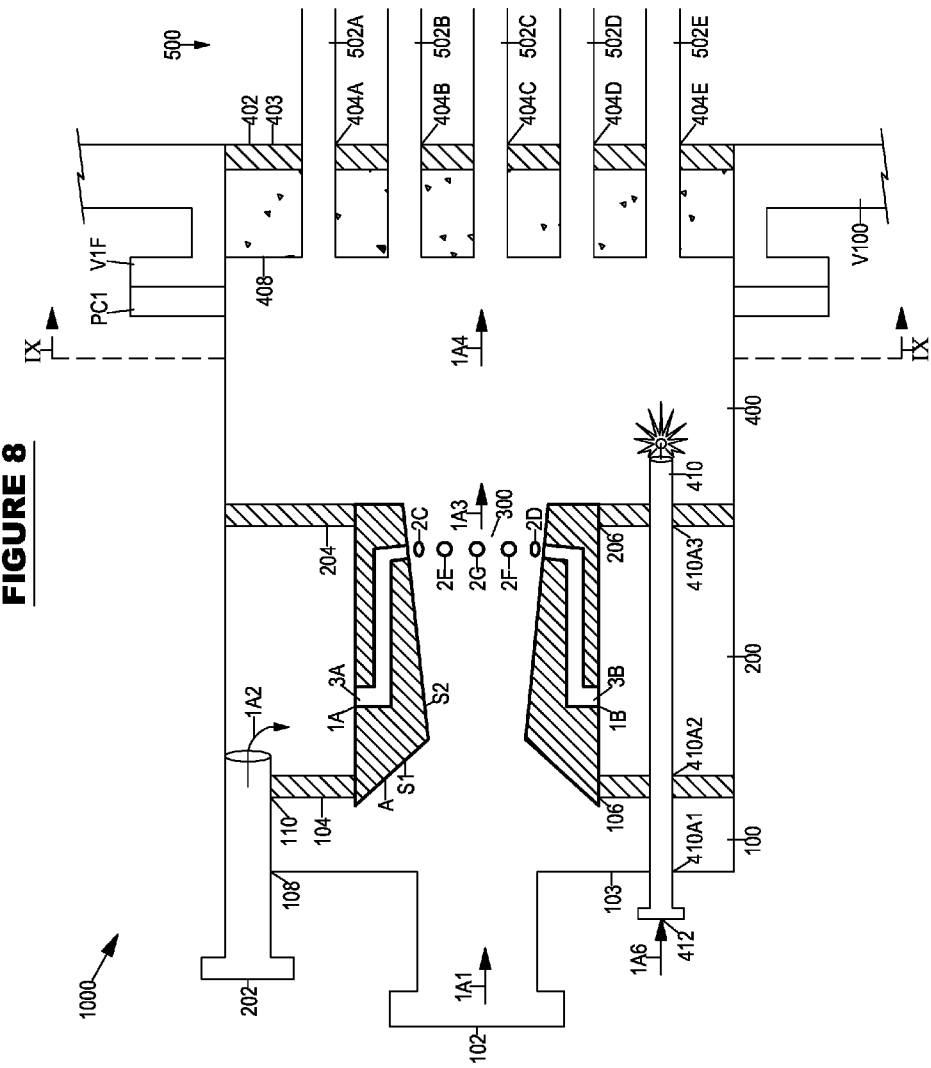
FIG. 8 depicts a zoomed-in view of a pulse combustion heat exchanger (1000) oxidant inlet section (100), fuel inlet section (200), mixing section (300), combustion section (400), and a first portion of the heat transfer section (500), wherein one aerovalve (A) is positioned in between the oxidant inlet section (100) and the combustion section (400) and one ignitor (410) is positioned in the combustion section (400).

FIG. 8 depicts a zoomed-in view of a pulse combustion heat exchanger (1000) oxidant inlet section (100), fuel inlet section (200), mixing section (300), combustion section (400), and a first portion of the heat transfer section (500), wherein one aerovalve (A) is positioned in between the oxidant inlet section (100) and the combustion section (400) and one ignitor (410) is positioned in the combustion section (400).

FIG. 8 also depicts one non-limiting embodiment of a vessel (V100) equipped with a pulse combustion heat exchanger (1000). The pulse combustion heat exchanger (1000) has a first flange (PC1) that is connected to a first vessel flange (V1F).

Oxidant (1A1) is introduced into the oxidant inlet section (100) via an oxidant inlet (102). The oxidant inlet section (100) has an interior that is defined by a first plate (103) and a second plate (104). The oxidant inlet (102) is interposed in the first plate (103) and is configured to transfer oxidant (1A1) into the interior of the oxidant inlet section (100). Oxidant (1A1) is transferred from the oxidant inlet section (100) into the aerovalve (A) via an aerovalve aperture (106). Oxidant (1A1) is mixed with fuel (1A2) within the interior of the aerovalve (A) to form an oxidant and fuel mixture (1A3).

Fuel (1A2) is transferred into the fuel inlet section (200) via a fuel inlet (202). The fuel inlet (202) passes through the first plate (103) of the oxidant inlet section (100) via a first fuel aperture (108) and then through the second plate (104) of the oxidant inlet section (100) into the fuel inlet section (200) via a second fuel aperture (110). The fuel inlet section (200) has an interior that is defined by the second plate (104) and the third plate (204).

The oxidant (1A1) and fuel (1A2) mix within the mixing section (300) within the aerovalve (A) and form an oxidant and fuel mixture (1A3). The oxidant and fuel mixture (1A3) is transferred from the mixing section (300) into the combustion section (400) where it is ignited to form a pulsating combustion stream (1A4).

The combustion section (400) has an interior that is defined by the third plate (204) and a fourth plate (402). The fourth plate has a plurality of apertures (404, 404A, 404B, 404C, 404D, 404E) within it each having a resonance conduit (502A, 502B, 502C, 502D, 502E) inserted into. The combustion section (400) has a second refractory section (408) that is positioned within the interior of the combustion section (400) and connected to the fourth plate (402).

In embodiments, the fourth plate (402) may be a tubesheet (403) having a plurality of apertures (404, 404A, 404B, 404C, 404D, 404E) for which a plurality of resonance conduits (502A, 502B, 502C, 502D, 502E) are shown inserted into.

The plurality of resonance conduits (502A, 502B, 502C, 502D, 502E) define the heat transfer section (500). The heat transfer section (500) is connected to the decoupler section (600). The decoupler section (600) has an interior that is defined by a fifth plate (602) and a combustion stream outlet (606). The fifth plate (602) has a plurality of apertures (604A, 604B, 604C, 604D) within it that the plurality of resonance conduits (502A, 502B, 502C, 502D, 502E) are inserted into (See FIG. 17).

FIG. 8 shows one ignitor (410) positioned in the combustion section (400) and in fluid communication with the mixing section (400). The ignitor (410) is configured to ignite the oxidant and fuel mixture (1A3) to create a pulsating combustion stream (1A4). An ignitor mixture (1A6) is made available to the ignitor (410) via an ignitor input (412). The ignitor mixture (1A6) is a mixture of fuel and oxidant that is provided by an ignitor fuel supply and an ignitor oxidant supply. FIG. 8 shows the ignitor (410) extending into the combustion section (400) by passing through the first, second, and third plates (103, 104, 204). The first plate (103) has a first ignitor aperture (410A1), the second plate (104) has a second ignitor aperture (410A2), and the third plate has a third ignitor aperture (410A3).

Figure 9:
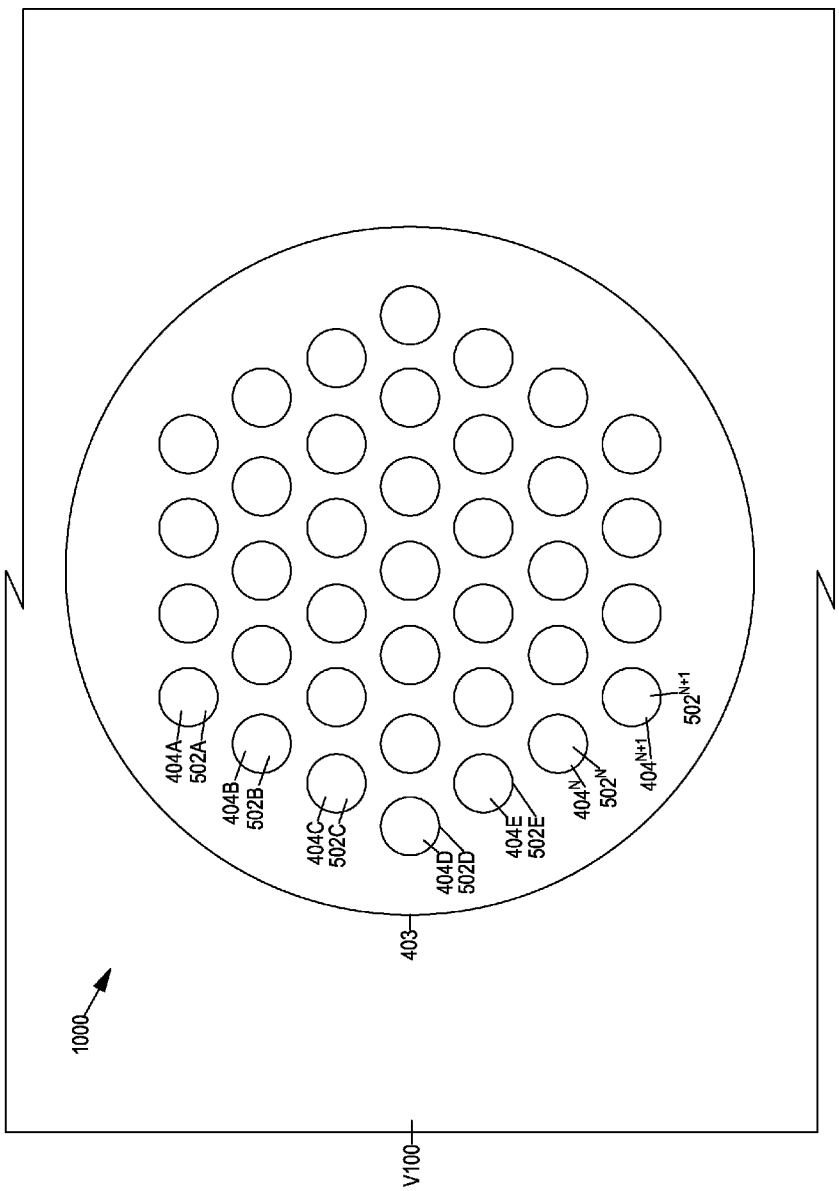
FIG. 9 shows one non-limiting embodiment of a combustion section side-view (IX-IX) that depicts a plurality of apertures (404, 404A, 404B, $404^N$, $404^{N+1}$) within the combustion section (400) tubesheet (403) and a plurality of resonance conduits (502, 502A, 502B, 502C, 502D, 502E, $502^N$, $502^{N+1}$) are positioned within the plurality of apertures (404, 404A, 404B, $404^N$, $404^{N+1}$).

Reference numerals (IX-IX) in FIG. 8 depict the combustion section side-view that is elaborated upon in FIG. 9.

FIG. 9

FIG. 9 shows one non-limiting embodiment of a combustion section side-view (IX-IX) that depicts a plurality of apertures (404, 404A, 404B, $404^N$, $404^{N+1}$) within the combustion section (400) tubesheet (403) and a plurality of resonance conduits (502, 502A, 502B, 502C, 502D, 502E, $502^N$, $502^{N+1}$) are positioned within the plurality of apertures (404, 404A, 404B, $404^N$, $404^{N+1}$).

FIG. 10

Figure 10:
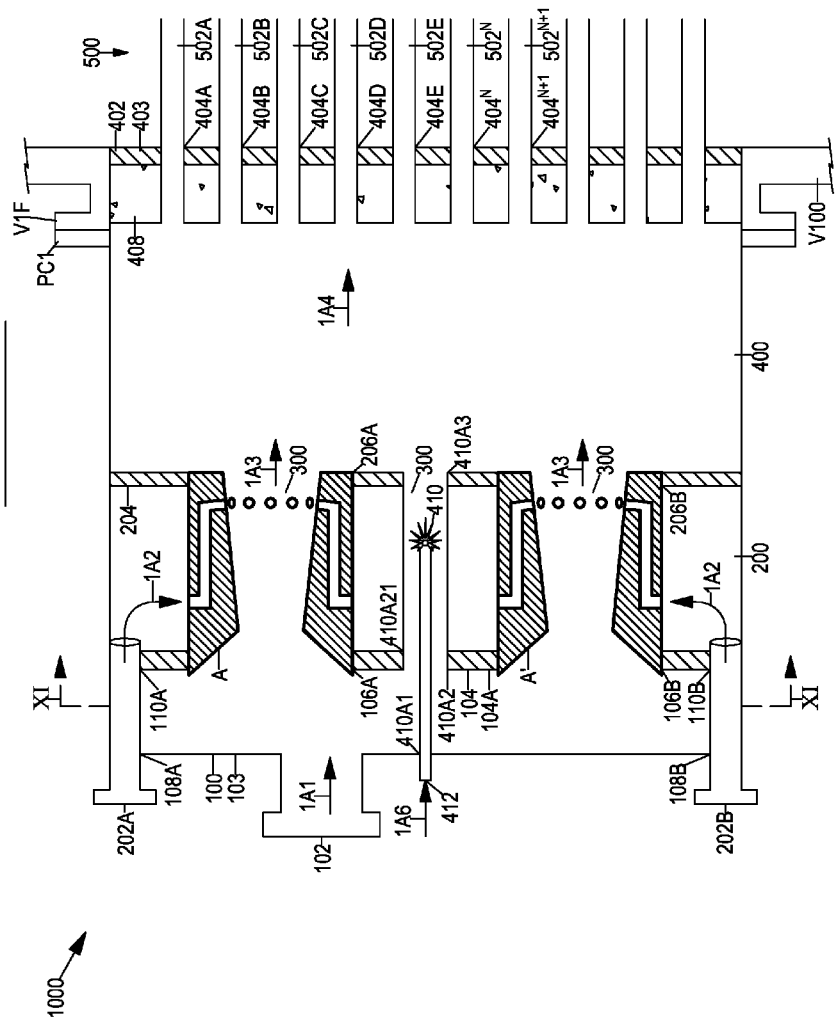
FIG. 10 shows a zoomed-in view of a pulse combustion heat exchanger (1000) oxidant inlet section (100), fuel inlet section (200), mixing section (300), combustion section (400), and a first portion of the heat transfer section (500) wherein a plurality of aerovalves (A, A') are positioned in between the oxidant inlet section (100) and the combustion section (400) and one ignitor (410) is positioned in the mixing section (300).

FIG. 10 shows a zoomed-in view of a pulse combustion heat exchanger (1000) oxidant inlet section (100), fuel inlet section (200), mixing section (300), combustion section (400), and a first portion of the heat transfer section (500) wherein a plurality of aerovalves (A, A') are positioned in between the oxidant inlet section (100) and the combustion section (400) and one ignitor (410) is positioned in the mixing section (300).

FIG. 10 depicts one non-limiting embodiment of a vessel (V100) equipped with a pulse combustion heat exchanger (1000). The pulse combustion heat exchanger (1000) has a first flange (PC1) that is connected to a first vessel flange (V1F).

Oxidant (1A1) is introduced into the oxidant inlet section (100) via an oxidant inlet (102). The oxidant inlet section (100) has an interior that is defined by a first plate (103) and a second plate (104). The oxidant inlet (102) is interposed in the first plate (103) and is configured to transfer oxidant (1A1) into the interior of the oxidant inlet section (100). Oxidant (1A1) is transferred from the oxidant inlet section (100) into the plurality of aerovalves (A, A') via a plurality of aerovalve apertures (106A, 106B). Oxidant (1A1) is mixed with fuel (1A2) within the interior of the plurality of aerovalves (A, A') to form an oxidant and fuel mixture (1A3). The interior of the plurality of aerovalves (A, A') is considered the mixing section (300) of the pulse combustion heat exchanger (1000).

Fuel (1A2) is transferred into the fuel inlet section (200) via a first fuel inlet (202A) and a second fuel inlet (202B). The plurality fuel inlets (202A, 202B) pass through the first plate (103) of the oxidant inlet section (100) via a plurality of first fuel apertures (108A, 108B). The plurality fuel inlets (202A, 202B) pass through the first plate (103) of the oxidant inlet section (100) via a first first fuel aperture (108A) and a second first fuel aperture (108B). The plurality fuel inlets (202A, 202B) then pass through the second plate (104) of the oxidant inlet section (100) via a plurality of second fuel apertures (110A, 110B). The plurality fuel inlets (202A, 202B) then pass through the second plate (104) of the oxidant inlet section (100) via a first second fuel aperture (110A) and a second second fuel aperture (110B). The fuel inlet section (200) has an interior that is defined by the second plate (104) and the third plate (204).

The oxidant (1A1) and fuel (1A2) mix within the mixing section (300) within the aerovalves (A, A') and form an oxidant and fuel mixture (1A3). The oxidant and fuel mixture (1A3) are ignited in the mixing section (300) to form a pulsating combustion stream (1A4). The combustion section (400) has an interior that is defined by the third plate (204) and a fourth plate (402). The fourth plate has a plurality of apertures (404, 404A, 404B, 404C, 404D, 404E, $404^N$, $404^{N+1}$) within it each having a resonance conduit (502A, 502B, 502C, 502D, 502E, $502^N$, $502^{N+1}$) inserted into. The combustion section (400) has a second refractory section (408) that is positioned within the interior of the combustion section (400) and connected to the fourth plate (402). In embodiments, the fourth plate (402) may be a tubesheet (403) having a plurality of apertures (404, 404A, 404B, 404C, 404D, 404E, $404^N$, $404^{N+1}$) for which a plurality of resonance conduit (502A, 502B, 502C, 502D, 502E, $502^N$, $502^{N+1}$) are shown inserted into. The plurality of resonance conduits (502A, 502B, 502C, 502D, 502E, $502^N$, $502^{N+1}$) define the heat transfer section (500). The heat transfer section (500) is connected to the decoupler section (600).

FIG. 10 shows one ignitor (410) positioned in the mixing section (300) and in fluid communication with the combustion section (400). The ignitor (410) is configured to ignite the oxidant and fuel mixture (1A3) to create a pulsating combustion stream (1A4). An ignitor mixture (1A6) is made available to the ignitor (410) via an ignitor input (412). The ignitor mixture (1A6) is a mixture of fuel and oxidant. FIG. 10 shows the ignitor (410) extending into the mixing section (300) by passing through the first and second plates (103, 104). The ignitor (410) is in fluid communication with the combustion section (400) via a third ignitor aperture (410A3) in the third plate (204). The first plate (103) has a first ignitor aperture (410A1), the second plate (104) has a second ignitor aperture (410A2), and the third plate has a third ignitor aperture (410A3). In embodiments, the second plate (104) is in the form of a tubesheet (104A). In embodiments, the third plate (204) is in the form of a tubesheet (205).

Figure 11:
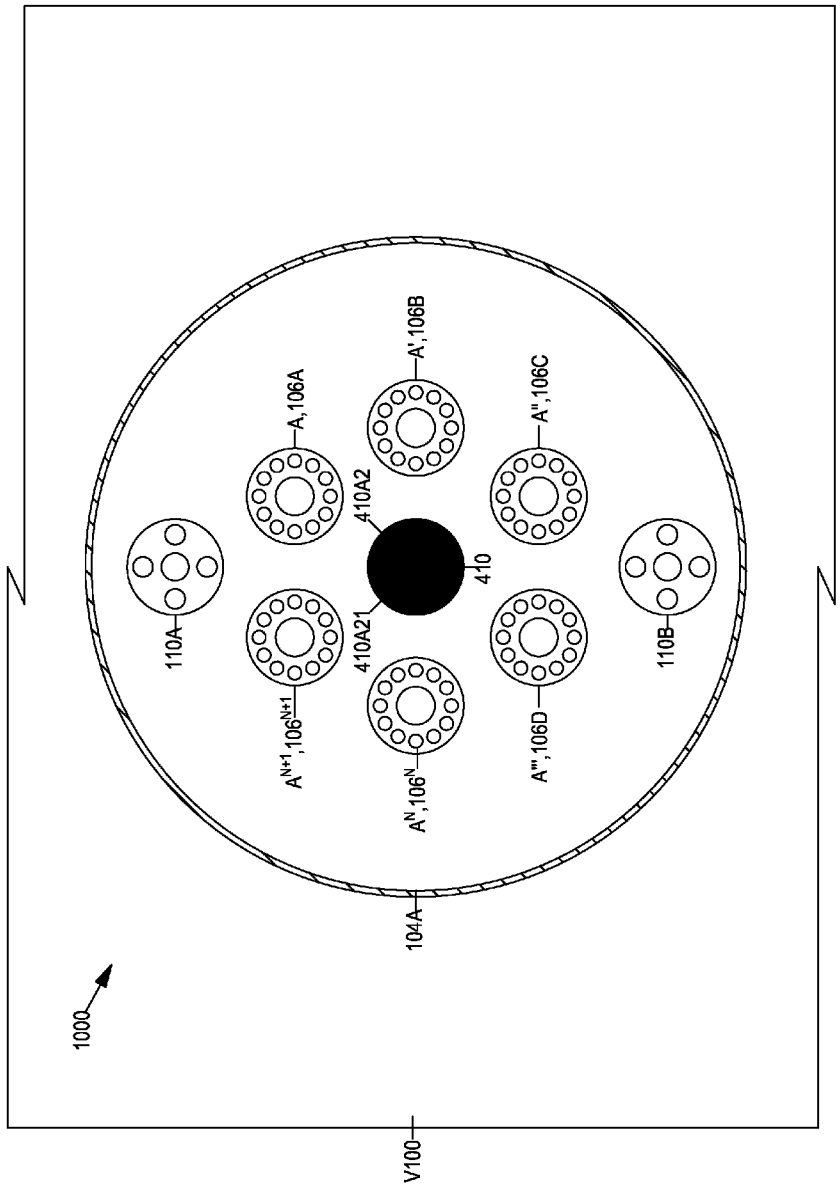
FIG. 11 shows one non-limiting embodiment of an oxidant inlet section side-view (XI-XI) that depicts a plurality of aerovalves (A, A', A", A''', $A^N$, $A^{N+1}$) inserted into a plurality of aerovalve apertures (106, 106A, 106B, 106C, 106D, $106^N$, $106^{N+1}$) within the oxidant inlet section (100) tubesheet (104A), also showing an ignitor aperture (410A2, 410A21) positioned in the tubesheet (104A) for insertion of an ignitor (410) through the tubesheet (104A) into the mixing section (300), and also showing a plurality of apertures (110A, 110B) in the tubesheet (104A) for introducing oxidant (1A1) into the mixing section (300).
Figure 12:
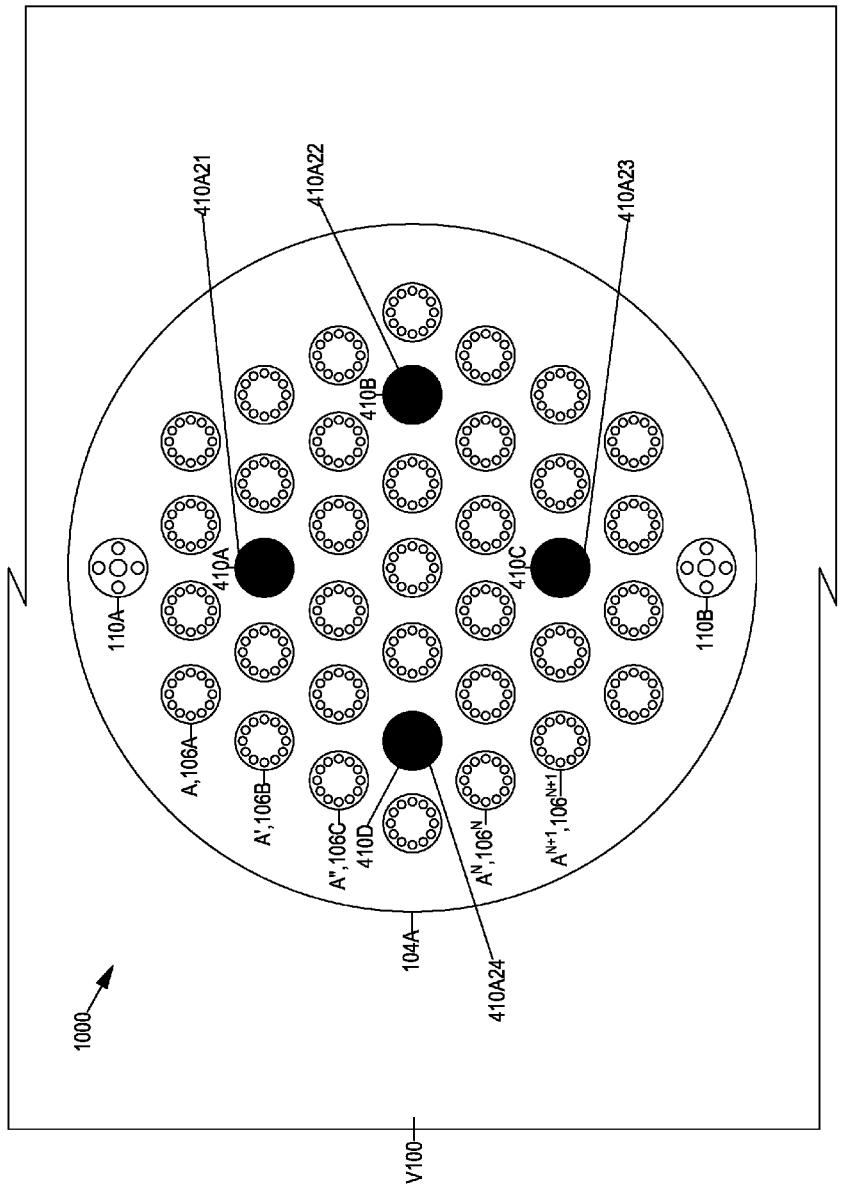
FIG. 12 elaborates upon the oxidant inlet section side-view (XI-XI) disclosure of FIG. 11 however showing the oxidant inlet section (100) tubesheet (104A) having 33 aerovalves (A, A', A", A''', $A^N$, $A^{N+1}$), and 4 ignitor apertures (410A21, 410A22, 410A23, 410A24) that are configured to have a plurality of ignitors (410A, 410B, 410C, 410D) inserted into.

Reference numerals (XI-XI) in FIG. 10 depict the oxidant section side-view that is elaborated upon in FIGS. 11 and 12.

FIG. 11

FIG. 11 shows one non-limiting embodiment of an oxidant inlet section side-view (XI-XI) that depicts a plurality of aerovalves (A, A', A", A'", $A^N$, $A^{N+1}$) inserted into a plurality of aerovalve apertures (106, 106A, 106B, 106C, 106D, $106^N$, $106^{N+1}$) within the oxidant inlet section (100) tubesheet (104A), also showing an ignitor aperture (410A2, 410A21) positioned in the tubesheet (104A) for insertion of an ignitor (410) through the tubesheet (104A) into the mixing section (300), and also showing a plurality of apertures (110A, 110B) in the tubesheet (104A) for introducing oxidant (1A1) into the mixing section (300).

FIG. 12

FIG. 12 elaborates upon the oxidant inlet section side-view (XI-XI) disclosure of FIG. 11 however showing the oxidant inlet section (100) tubesheet (104A) having 33 aerovalves (A, A', A", A'", $A^N$, $A^{N+1}$) and 4 ignitor apertures (410A21, 410A22, 410A23, 410A24) that are configured to have a plurality of ignitors (410A, 410B, 410C, 410D) inserted into.

FIG. 13

Figure 13:
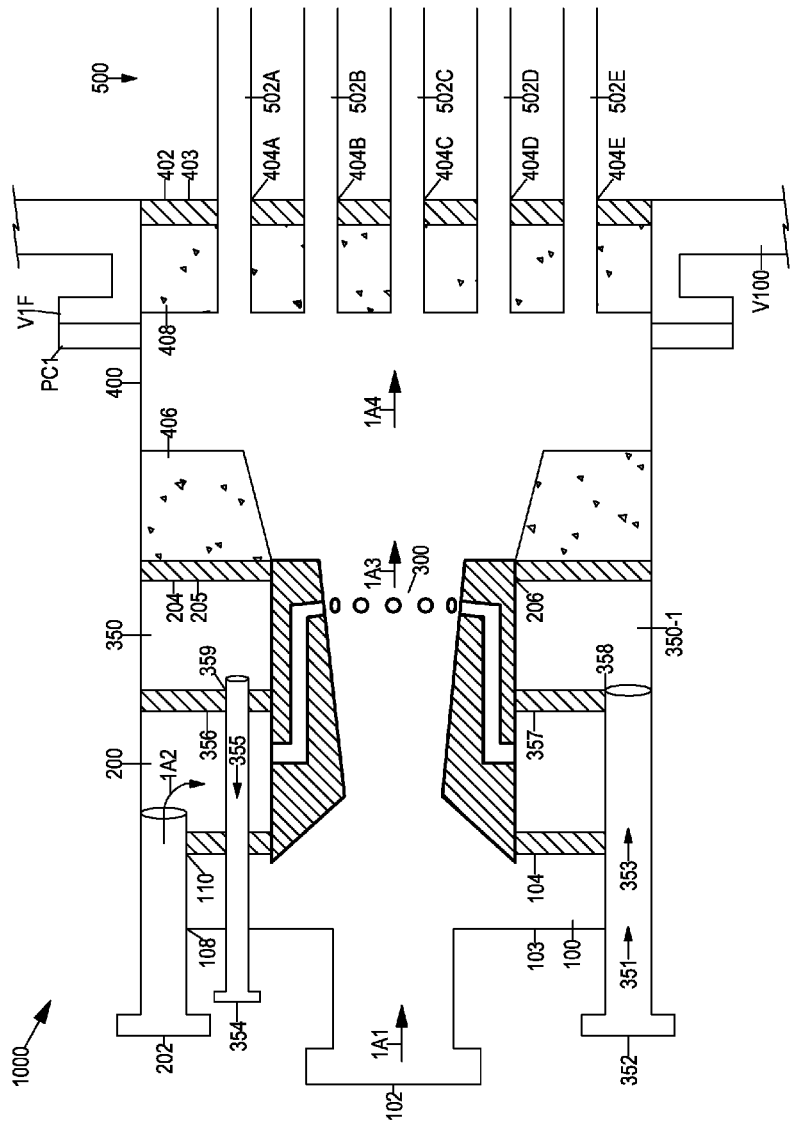
FIG. 13 shows a zoomed-in view of a pulse combustion heat exchanger (1000) oxidant inlet section (100), fuel inlet section (200), mixing section (300), combustion section (400), and a first portion of the heat transfer section (500) wherein one aerovalve (A) is positioned in between the oxidant inlet section (100) and the combustion section (400), and a third transition section (350) is positioned between the mixing section (300) and the combustion section (400) and is provided with a third coolant (351).

FIG. 13 shows a zoomed-in view of a pulse combustion heat exchanger (1000) oxidant inlet section (100), fuel inlet section (200), mixing section (300), combustion section (400), and a first portion of the heat transfer section (500) wherein one aerovalve (A) is positioned in between the oxidant inlet section (100) and the combustion section (400), and a third transition section (350) is positioned between the mixing section (300) and the combustion section (400) and is provided with a third coolant (351).

FIG. 13 shows a third transition plate (356) interposed in between the second plate (104) and third plate (204). The third transition section (350) is the interior in between the third transition plate (356) and the second plate (204). The third transition section (350) is positioned between the mixing section (300) and the combustion section (400) and is provided with a third coolant (351). In embodiments, the third coolant (351) is a cooling water supply (353). In embodiments, the third transition plate (356) is in the form of a tubesheet (357). In embodiments, the second plate (104) is in the form of a tubesheet (104A). In embodiments, the third plate (204) is in the form of a tubesheet (205).

In embodiments, the third transition section (350) includes a pair of parallel tubesheets (357, 205) defining a third interior space (350-1) therebetween. A third coolant inlet (352) is in fluid communication with the third interior space (350-1). A third coolant outlet (354) is in fluid communication with the third interior space (350-1). The third coolant inlet (352), the third interior space (350-1), and the third coolant outlet (354) together define a third coolant path through the third transition section (350).

FIG. 14

Figure 14:
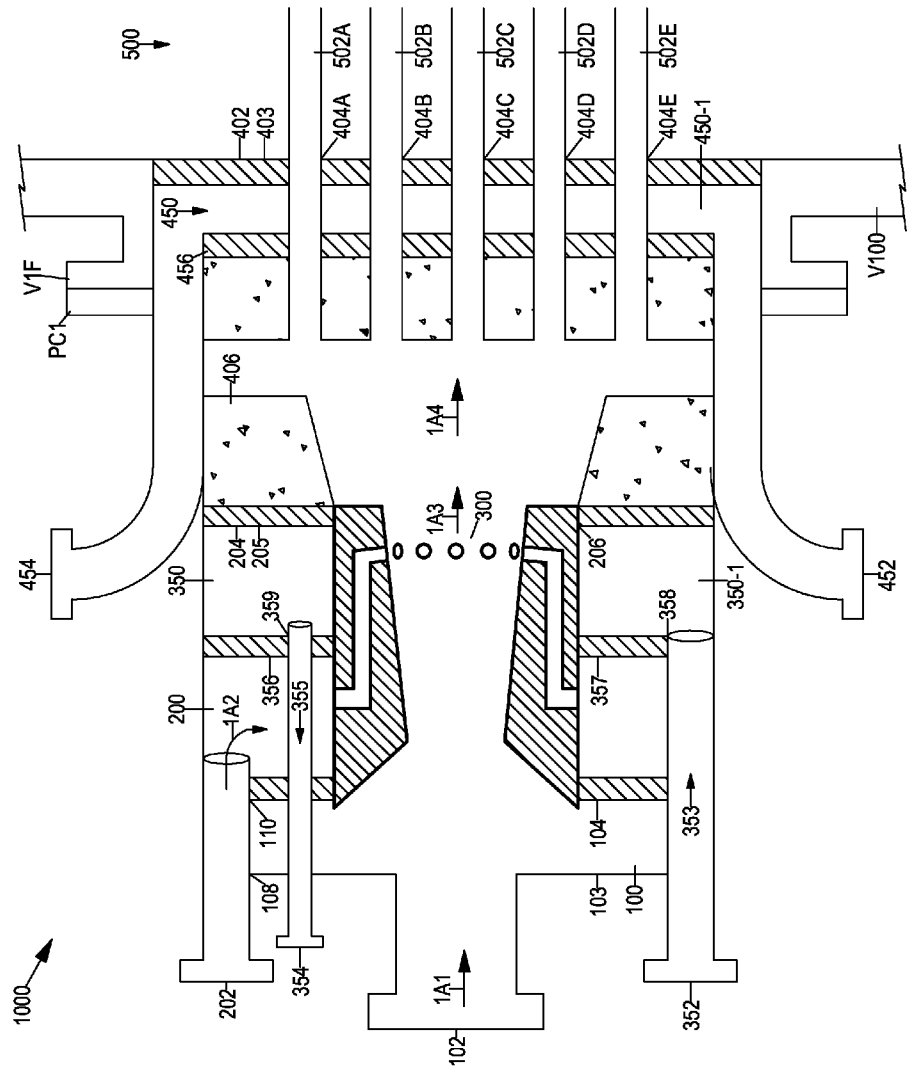
FIG. 14 elaborates upon the non-limiting embodiment of FIG. 13 and shows a first transition section (450) configured to cool in between the combustion section (400) and the heat transfer section (500) via a coolant inlet (452) and a coolant outlet (454).

FIG. 14 elaborates upon the non-limiting embodiment of FIG. 13 and shows a first transition section (450) configured to cool in between the combustion section (400) and the heat transfer section (500) via a coolant inlet (452) and a coolant outlet (454).

In embodiments, a first transition section (450) is positioned in between the combustion section (400) and the heat transfer section (500). In embodiments, the fourth plate (402) in between the combustion section (400) and the heat transfer section (500) is in the form of a tubesheet (403). In embodiments, another plate (456) in the form of a tubesheet (457) with a plurality of apertures (458A, 458B, 458B. 458D, 458E, $458^N$, $458^{N+1}$) is spaced apart from and substantially parallel to the fourth plate (402) in between the combustion section (400) and the heat transfer section (500).

In embodiments, the first transition section (450) has a first pair of parallel tubesheets (403, 457) defining a first interior space (450-1) therebetween. A first coolant inlet (452) is in fluid communication with the first interior space (450-1) and first coolant outlet (454) is in fluid communication with the first interior space (450-1). The first coolant inlet (452), the first interior space (450-1), and the first coolant outlet (454) together define the first coolant path through the first transition section (450).

FIG. 15

Figure 15:
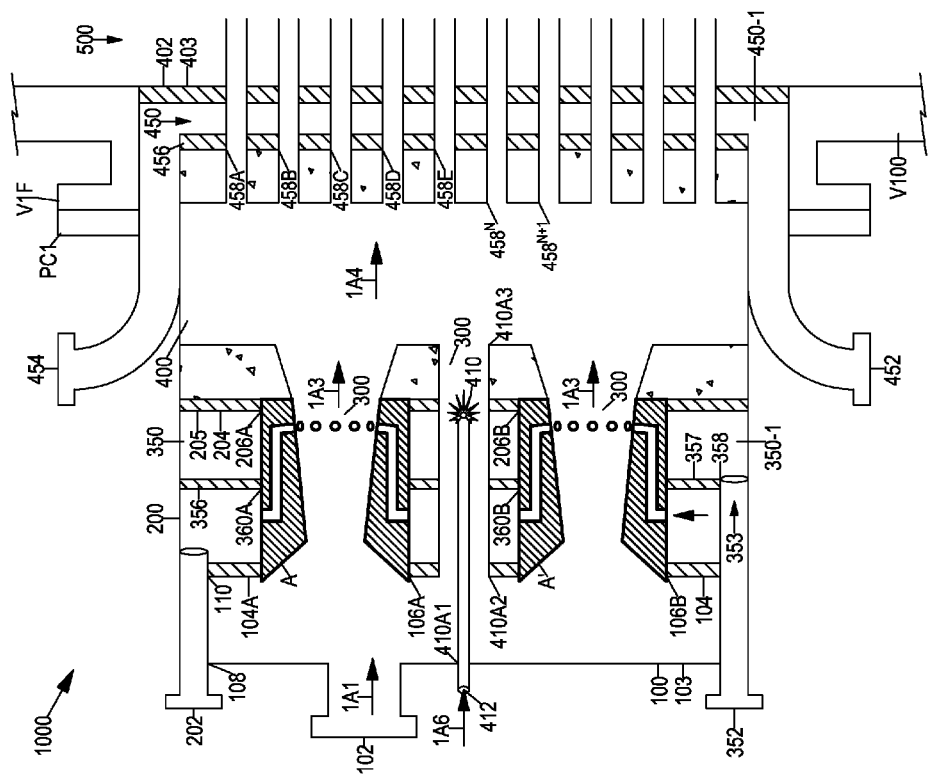
FIG. 15 elaborates upon the non-limiting embodiment of FIGS. 10, 13, and 14 and shows a plurality of aerovalves (A, A') positioned in between the oxidant inlet section (100) and the combustion section (400), a first transition section (450) positioned between the combustion section (400) and the heat transfer section (500) that is provided with a first coolant (451), and a third transition section (350) is positioned between the mixing section (300) and the combustion section (400) and is provided with a third coolant (351).

FIG. 15 elaborates upon the non-limiting embodiment of FIGS. 10, 13, and 14 and shows a plurality of aerovalves (A, A') positioned in between the oxidant inlet section (100) and the combustion section (400), a first transition section (450) positioned between the combustion section (400) and the heat transfer section (500) that is provided with a first coolant (451), and a third transition section (350) is positioned between the mixing section (300) and the combustion section (400) and is provided with a third coolant (351).

FIG. 16

Figure 16:
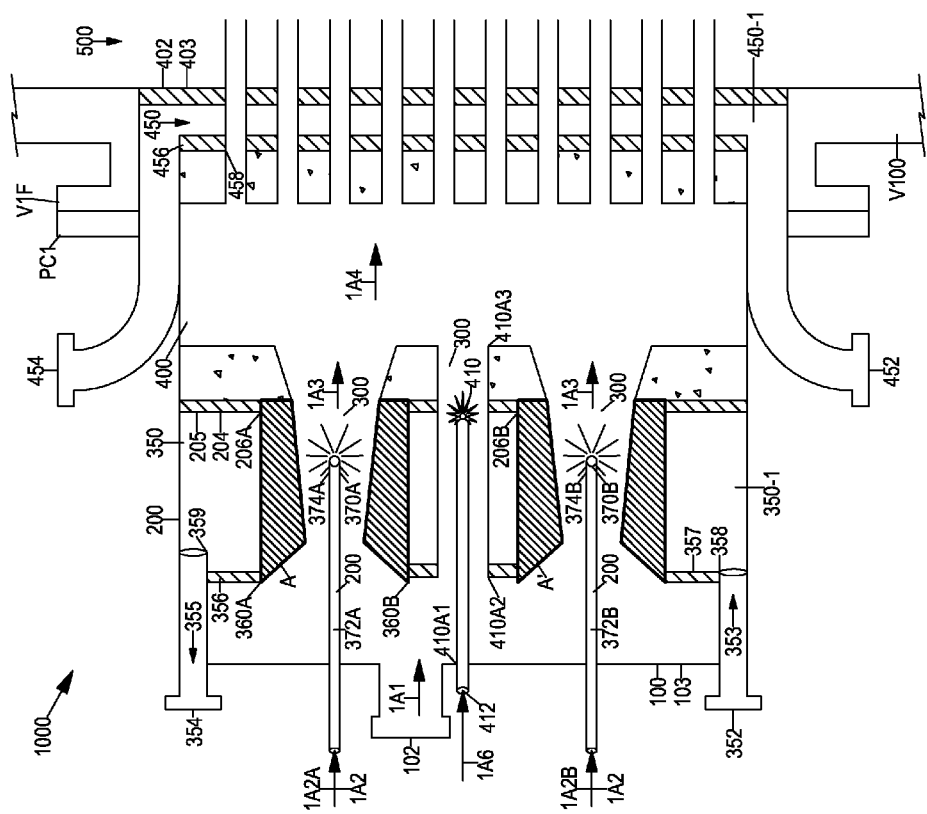
FIG. 16 elaborates upon the non-limiting embodiment of FIG. 15 and shows the fuel inlet section (200) contained within at least one fuel injector (370A, 370B), the fuel injector (370A, 370B) is comprised of a fuel injector conduit (372A, 372B) connected to a fuel injector distributor (374A, 374B), the fuel injector conduit (372A, 372B) is configured to accept fuel (1A2), and the fuel injector distributor (374A, 374B) is configured to transfer the fuel (1A2) from the fuel injector conduit (372A, 372B) into the mixing section (300).

FIG. 16 elaborates upon the non-limiting embodiment of FIG. 15 and shows the fuel inlet section (200) contained within at least one fuel injector (370A, 370B), the fuel injector (370A, 370B) is comprised of a fuel injector conduit (372A, 372B) connected to a fuel injector distributor (374A, 374B), the fuel injector conduit (372A, 372B) is configured to accept fuel (1A2, 1A2A, 1A2B), and the fuel injector distributor (374A, 374B) is configured to transfer the fuel (1A2, 1A2A, 1A2B) from the fuel injector conduit (372A, 372B) into the mixing section (300).

FIG. 16 shows a plurality of aerovalves (A, A') that are not equipped with fuel inlet ports (1A, 1B, . . . ), fuel outlet ports (2A, 2B, . . . ), or fuel transfer channels (3A, 3B, . . . ). Instead fuel (1A2) is introduced into the mixing section (300) via a plurality of fuel injectors (370A, 370B). The plurality of fuel injectors (370) may include a first fuel injector (370A) and a second fuel injector (370B).

The first fuel injector (370A) is equipped with a first fuel injector conduit (372A) and a first fuel injector distributor (374A) for introducing a first fuel (1A2A) into the mixing section (300). The fuel inlet section (200) may be contained within the first fuel injector conduit (372A). In embodiments, the first fuel injector distributor (374A) is equipped with one or a plurality of openings to permit uniform distribution of the first fuel (1A2A) into the interior of the first aerovalve (A).

The second fuel injector (370B) is equipped with a second fuel injector conduit (372B) and a second fuel injector distributor (374B) for introducing a second fuel (1A2B) into the mixing section (300). In embodiments, the second fuel injector distributor (374B) is equipped with one or a plurality of openings to permit uniform distribution of the second fuel (1A2B) into the interior of the second aerovalve (A'). The first fuel (1A2A) and second fuel (1A2B) may come from the same source of fuel (1A2).

FIG. 16 shows the fuel inlet section (200) contained within the plurality of fuel injectors (370A, 370B). Each fuel injector (370A, 370B) is comprised of a fuel injector conduit (372A, 372B) connected to a fuel injector distributor (374A, 374B), the fuel injector conduit (372A, 372B) is configured to accept fuel (1A2), and the fuel injector distributor (374A, 374B) is configured to transfer the fuel (1A2) from the fuel injector conduit (372A, 372B) into the mixing section (300).

FIG. 17

Figure 17:
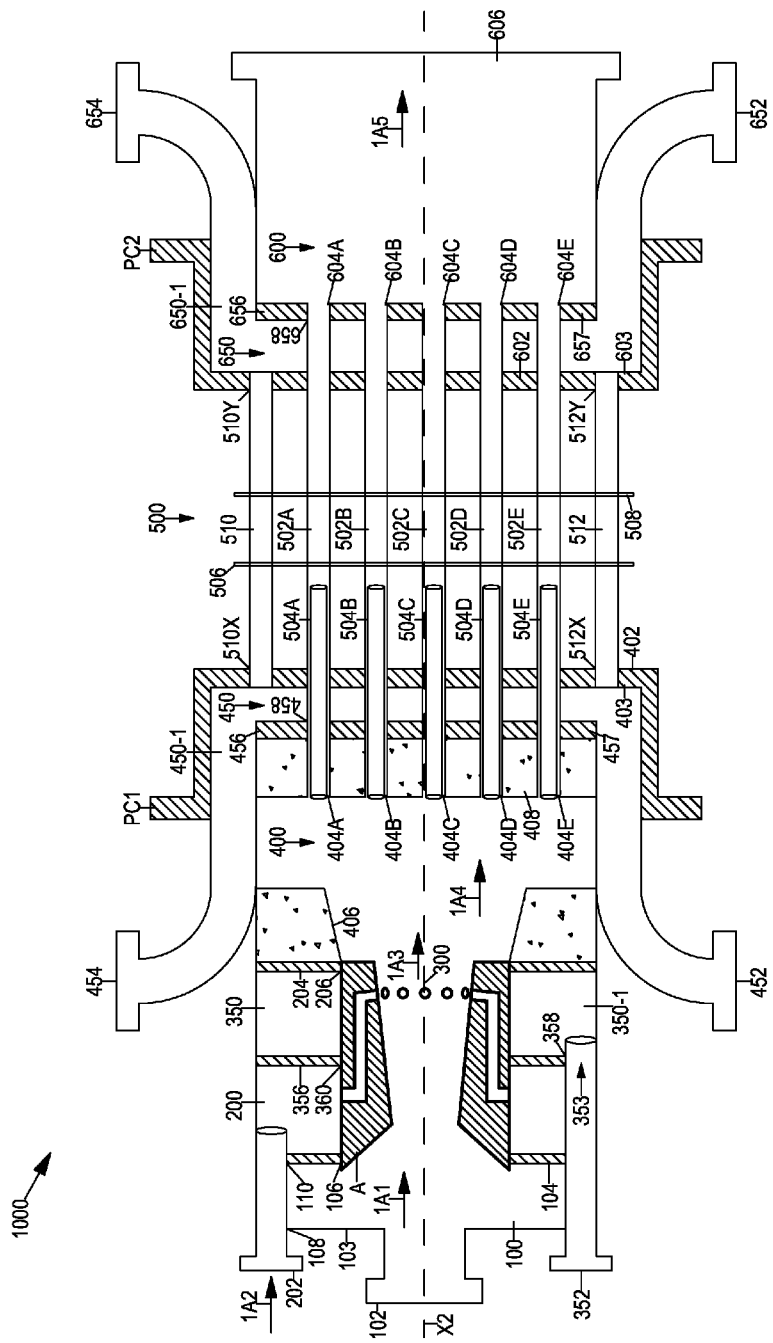
FIG. 17 shows one non-limiting embodiment of a pulse combustion heat exchanger (1000) that is configured to accept oxidant (1A1) and fuel (1A2) and output a cooled combustion stream (1A5).

FIG. 17 shows one non-limiting embodiment of a pulse combustion heat exchanger (1000) that is configured to accept oxidant (1A1) and fuel (1A2) and output a cooled combustion stream (1A5). The pulse combustion heat exchanger (1000) of FIG. 17 includes:

(a) an oxidant inlet section (100) that is configured to accept oxidant (1A1);

(b) a fuel inlet section (200) that is configured to accept fuel (1A2);

(c) a mixing section (300) including one aerovalve (A) that is configured to accept and mix oxidant (1A1) from the oxidant inlet section (100) with fuel (1A2) from the fuel inlet section (200) to create an oxidant and fuel mixture (1A3);

(d) a combustion section (400) configured to receive and combust the oxidant and fuel mixture (1A3) from the mixing section (300) to produce a pulsating combustion stream (1A4);

(e) a heat transfer section (500) configured to receive the combustion stream (1A4) from the combustion section (400), the heat transfer section (500) including one or more resonance conduits (502, 502A, 502B, 502C, 502D, 502E) that are configured to transfer heat from the combustion stream (1A4) to an energy sink (V108), wherein combustion of the oxidant and fuel mixture (1A3) may continue to take place within the heat transfer section (500);

(f) a first transition section (450) positioned between the combustion section (400) and the heat transfer section (500), the first transition section (450) comprising a first coolant path configured to receive a first coolant (451);

(g) a second transition section (650) connected to the heat transfer section (500) and configured to receive the combustion stream (1A4) from the heat transfer section (500) and output a cooled combustion stream (1A5), the second transition section (650) comprising a second coolant path configured to receive a second coolant (651);

(h) a decoupler section (600) connected to the second transition section (650) and configured to accept the cooled combustion stream (1A5) from the second transition section (650) and output the cooled combustion stream (1A5) via a combustion stream outlet (606); and (i) a third transition section (350) positioned between the mixing section (300) and the combustion section (400) that is provided with a third coolant (351).

In embodiments, the first transition section (450) comprises: a first pair of parallel tubesheets (403, 457) defining a first interior space (450-1) therebetween, a first coolant inlet (452) in fluid communication with the first interior space (450-1) that is configured to receive a first coolant (651), and a first coolant outlet (454) in fluid communication with the first interior space (450-1); wherein the first coolant inlet (452), the first interior space (450-1) and the first coolant outlet (454) together define the first coolant path through the first transition section (450).

In embodiments, the second transition section (650) comprises: a second pair of parallel tubesheets (603, 657) defining a second interior space (650-1) therebetween, a second coolant inlet (652) in fluid communication with the second interior space (650-1) that is configured to receive a second coolant (651), and a second coolant outlet (654) in fluid communication with the second interior space (650-1), wherein the second coolant inlet (652), the second interior space (650-1) and the second coolant outlet (654) together define the second coolant path through the second transition section (450).

In embodiments, the second transition section (650) cools a portion of the combustion stream (1A4) that is evacuated from the heat transfer section (500) to form cooled combustion stream (1A5). In embodiments, both the heat transfer section (500) and the second transition section (650) cool a portion of the combustion stream (1A4) that is evacuated from the heat transfer section (500) to form a cooled combustion stream (1A5). In embodiments, the combustion stream (1A4) that leaves the combustion section (400) may be partially cooled in the heat transfer section (500) to form a cooled combustion stream (1A5). In embodiments, the combustion stream (1A4) that leaves the combustion section (400) may be partially cooled in the second transition section (650) to form a cooled combustion stream (1A5).

In embodiments, the second pair of parallel tubesheets (603, 657) are defined by a fifth plate (602) and a sixth plate (656). The fifth plate (602) separates the heat transfer section (500) from the second interior space (650-1) of the second transition section (650). In embodiments, the fifth plate (602) is in the form of a tubesheet (603) having a plurality of apertures for inserting resonance conduits (502A, 502B, 502C, 502D, 502E) into. In embodiments, the sixth plate (656) separates the second interior space (650-1) of the second transition section (650) from the decoupler section (600). In embodiments, the sixth plate (656) is in the form of a tubesheet (657) having a plurality of apertures for inserting resonance conduits (502A, 502B, 502C, 502D, 502E) into.

In embodiments, the third transition section (350) comprises: a third pair of parallel tubesheets (357, 205) defining a third interior space (350-1) therebetween, a third coolant inlet (352) in fluid communication with the third interior space (350-1), and a third coolant outlet (354), in fluid communication with the third interior space (350-1), wherein the third coolant inlet (352), the third interior space (350-1) and the third coolant outlet (354) together define a third coolant path through the third transition section (350).

In embodiments, the plurality of resonance conduits (502A, 502B, 502C, 502D, 502E) define the heat transfer section (500). The heat transfer section (500) is connected to the decoupler section (600). The decoupler section (600) has an interior that is defined by the sixth plate (656) and a combustion stream outlet (606).

The oxidant (1A1) and fuel (1A2) mix within the mixing section (300) within the aerovalve (A) and form an oxidant and fuel mixture (1A3). The oxidant and fuel mixture (1A3) is transferred from the mixing section (300) into the combustion section (400) where it is ignited to form a pulsating combustion stream (1A4).

In embodiments, the resonance conduits (502, 502A, 502B, 502C, 502D, 502E, $502^N$, $502^{N+1}$) may have a radiation shield (504, 504A, 504B, 504C) inserted within them to minimize heat loss and limit the heat transferred from the combustion section (400) to the tubesheets (403, 457) in between the combustion section (400) and the heat transfer section (500). In embodiments, the radiation shield (504, 504A, 504B, 504C) may be a tube or pipe or conduit of a lesser diameter than the resonance conduits (502, 502A, 502B, 502C, 502D, 502E, $502^N$, $502^{N+1}$) and inserted into each aperture (404, 404A, 404B, $404^N$, $404^{N+1}$) in the tubesheet (403) inside of each resonance conduit (502).

In embodiments, the fourth plate (402) or tubesheet (403) closest to the combustion section (400) may be connected to the fifth plate (602) of the tubesheet (603) closest to the decoupler section (600) via a first support member (510) and a second support member (512).

The first support member (510) is connected to the fourth plate (402) via a first support member first connection (510X). The first support member (510) is connected to the fifth plate (602) first support member second connection (510Y). The second support member (512) is connected to the fourth plate (402) via a second support member first connection (512X). The second support member (512) is connected to the fifth plate (602) second support member second connection (512Y).

In embodiments the resonance conduits (502, 502A, 502B, 502C, 502D, 502E, $502^N$, $502^{N+1}$) and the support members (510, 512) may pass through a first baffle (506) and a second baffle (508).

FIG. 18

Figure 18:
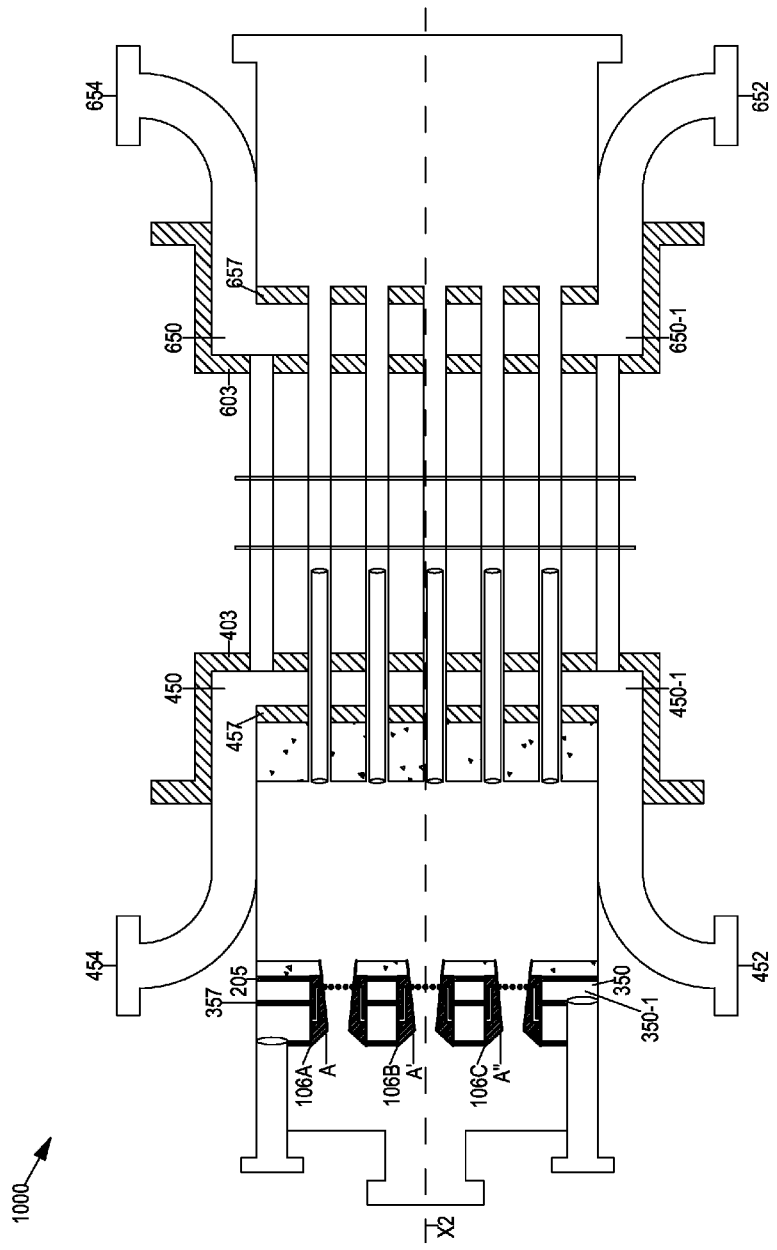
FIG. 18 elaborates upon the non-limiting embodiment of FIG. 17 however depicts the mixing section (300) with a plurality of aerovalves (A, A', A").

FIG. 18 elaborates upon the non-limiting embodiment of FIG. 17 however depicts the mixing section (300) with a plurality of aerovalves (A, A', A").

FIG. 19

Figure 19:
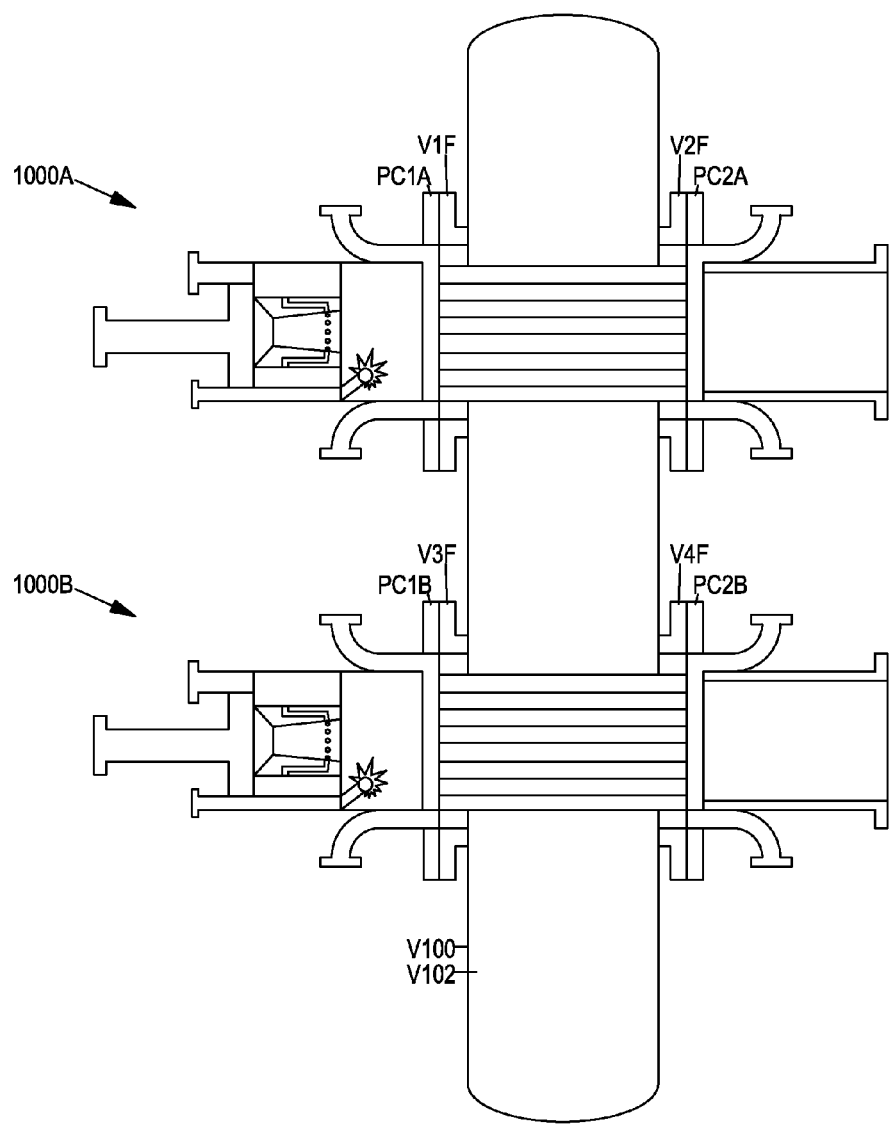
FIG. 19 depicts one non-limiting embodiment of a vessel (V100) equipped with a first pulse combustion heat exchanger (1000A) and a second pulse combustion heat exchanger (1000B), the first pulse combustion heat exchanger (1000A) has a first flange (PC1A) that is connected to a first vessel flange (V1F) and a second flange (PC2A) that is connected to a second vessel flange (V2F), and the second pulse combustion heat exchanger (1000B) has a first flange (PC1B) that is connected to a third vessel flange (V3F) and a second flange (PC2B) that is connected to a fourth vessel flange (V4F).

FIG. 19 depicts one non-limiting embodiment of a vessel (V100) equipped with a first pulse combustion heat exchanger (1000A) and a second pulse combustion heat exchanger (1000B), the first pulse combustion heat exchanger (1000A) has a first flange (PC1A) that is connected to a first vessel flange (V1F) and a second flange (PC2A) that is connected to a second vessel flange (V2F), and the second pulse combustion heat exchanger (1000B) has a first flange (PC1B) that is connected to a third vessel flange (V3F) and a second flange (PC2B) that is connected to a fourth vessel flange (V4F).

FIG. 20

Figure 20:
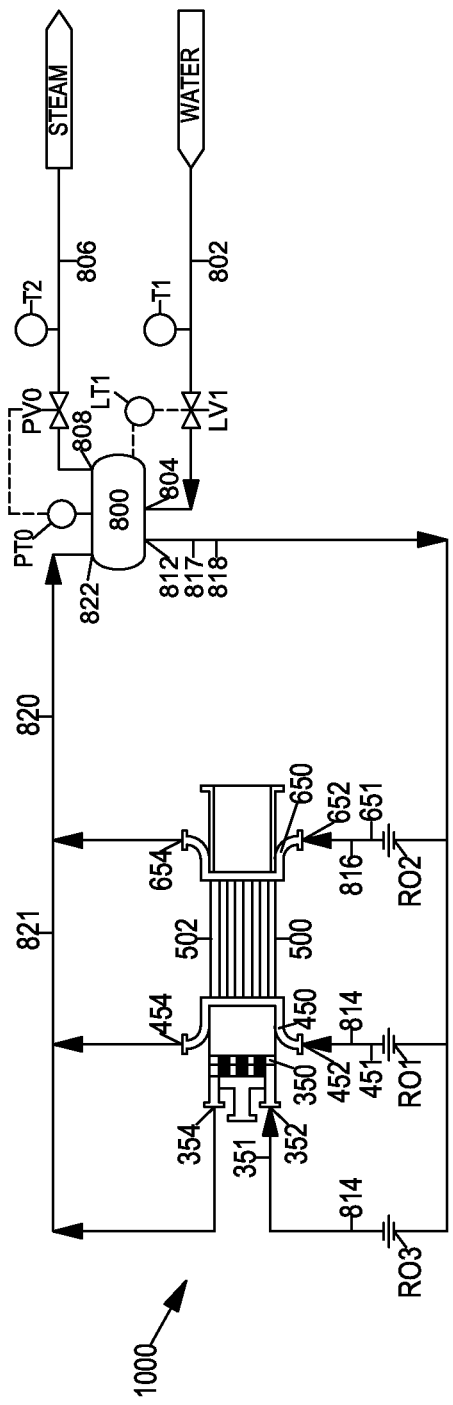
FIG. 20 depicts a pulse combustion heat exchanger (1000) having a first transition section (450) with a first coolant inlet (452) and a first coolant outlet (454), a second transition section (650) with a second coolant inlet (652) and a second coolant outlet (654), a third transition section (350) with a third coolant inlet (352) and a third coolant outlet (354), and a coolant recycling drum (800) in fluid communication with the first coolant inlet (452), the second coolant inlet (652), and the third coolant inlet (352) via a coolant transfer conduit (817).

FIG. 20 depicts a pulse combustion heat exchanger (1000) having a first transition section (450) with a first coolant inlet (452) and a first coolant outlet (454), a second transition section (650) with a second coolant inlet (652) and a second coolant outlet (654), a third transition section (350) with a third coolant inlet (352) and a third coolant outlet (354), and a coolant recycling drum (800) in fluid communication with the first coolant inlet (452), the second coolant inlet (652), and the third coolant inlet (352) via a coolant transfer conduit (817).

FIG. 20 shows one non-limiting embodiment of a pulse combustion heat exchanger (1000) including a coolant recycling drum (800). The coolant recycling drum (800) is configured to accept a source of water (802) via a water inlet (804). A level sensor (LT1) is configured to measure the level of water (802) within the coolant recycling drum (800) and permit water (802) to enter via a water inlet (804) on level control through a level control valve (LV1).

Steam (806) is generated within the first transition section (450), second transition section (650), and third transition section (350) of the pulse combustion heat exchanger (1000). The generated steam (806) from each section (450, 650, 350) is sent to the coolant recycling drum (800) via a steam conduit (821) and drum inlet (822). The coolant recycling drum (800) is equipped with a pressure sensor (PT0). When a pre-determined pressure within the coolant recycling drum (800) is achieved, steam (806) is released from the coolant recycling drum (800) via a steam outlet (808) on pressure control where it then passes through a pressure control valve (PV0).

FIG. 20 shows the first transition section (450) provided with a first coolant inlet (452) and a first coolant outlet (454), the second transition section (650) provided with a second coolant inlet (652) and a second coolant outlet (654), and the third transition section (350) having a third coolant inlet (352) and a third coolant outlet (354). The third transition section (350) is between the mixing section (300) and the combustion section (400).

The pulse combustion heat exchanger (1000) further comprises a coolant recycling drum (800) having a drum outlet (812) in fluid communication with the first, second, and third coolant inlets (452, 652, 352) and further having drum inlet (822) in fluid communication with the first, second, and third coolant outlets (454, 654, 354).

In embodiments, a first restriction orifice (RO1) is positioned between the coolant recycling drum (800) and the first coolant inlet (452). In embodiments, a second restriction orifice (RO2) is positioned in between the coolant recycling drum (800) and the second coolant inlet (652). In embodiments, a third restriction orifice (RO3) is positioned between the coolant recycling drum (800) and the third coolant inlet (352).

FIG. 21

Figure 21:
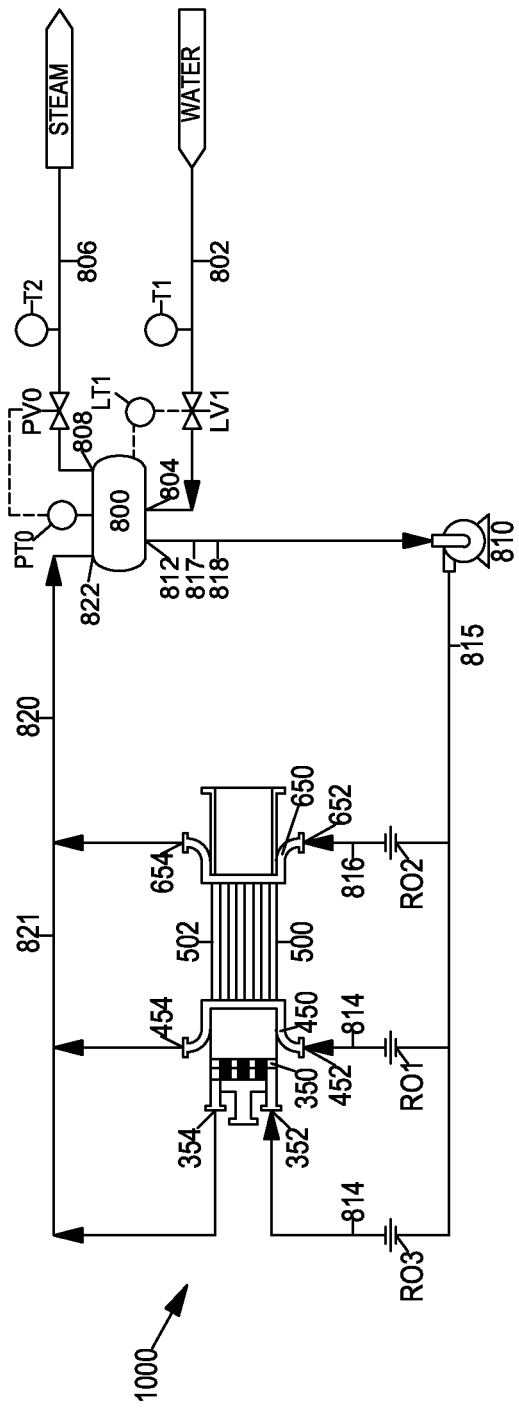
FIG. 21 elaborates upon the non-limiting embodiment of FIG. 20 including a recycling pump (810) interposed on the coolant transfer conduit (817) to pressurize the coolant (818) provided by the coolant recycling drum (800) and provide a source of pressurized coolant (815) to the first coolant inlet (452), the second coolant inlet (652), and the third coolant inlet (352).

FIG. 21 elaborates upon the non-limiting embodiment of FIG. 20 including a recycling pump (810) interposed on the coolant transfer conduit (817) to pressurize the coolant (818) provided by the coolant recycling drum (800) and provide supply coolant (815) to the first coolant inlet (452), the second coolant inlet (652), and the third coolant inlet (352).

FIG. 21 shows a recycling pump (810) interposed between the drum outlet (812) and the first, second, and third coolant inlets (452, 652, 352), the recycling pump (810) configured to supply coolant (815) under pressure to the first and second coolant inlets (452, 652). The first coolant inlet (452) is configured to receive a first coolant (451). The second coolant inlet (652) is configured to receive a second coolant (651). The third coolant inlet (352) is configured to receive a third coolant (351). The first, second, and third coolants (451, 651, 351) are transferred to the first coolant inlet (452), the second coolant inlet (652), and the third coolant inlet (352) from the coolant recycling drum (800).

In embodiments, a first restriction orifice (RO1) is positioned between the recycling pump (810) and the first coolant inlet (452). In embodiments, a second restriction orifice (RO2) is positioned in between the recycling pump (810) and the second coolant inlet (652). In embodiments, a third restriction orifice (RO3) is positioned between the coolant recycling drum (800) and the third coolant inlet (352). In embodiments, a third transition section (350) in between the mixing section (300) and the combustion section (400) has a third coolant inlet (352) and a third coolant outlet (354), In embodiments, the coolant recycling drum (800) has a drum outlet (812) in fluid communication with the third coolant inlet (352) and further having drum inlet (822) in fluid communication with the third coolant outlet (354). In embodiments, a recycling pump (810) is interposed between the drum outlet (812) and the third coolant inlet (352), the recycling pump (810) configured to supply coolant (815) under pressure to the third coolant inlets (352). In embodiments, a third restriction orifice (RO3) is positioned between the coolant recycling drum (800) and the third coolant inlet (352).

The pulse combustion heat exchanger (1000) such as that employed in the present disclosure, typically operates in the following manner. Oxidant (1A1) and fuel (1A2) are introduced to the mixing section (300) to form an oxidant and fuel mixture (1A3) which is then ignited. The oxidant and fuel mixture (1A3) may be ignited by an ignitor (410), a plurality of ignitors (410A, 410B), or by the combustion stream (1A4) within the combustion section (400). The oxidant and fuel mixture (1A3) may be ignited in the mixing section (300) or the combustion section (400). Explosion of the oxidant and fuel mixture (1A3) causes a sudden increase in volume and evolution of a combustion stream (1A4) which pressurizes the combustion section (400). A sudden increase in volume, triggered by the rapid increase in temperature and evolution of the combustion stream (1A4), pressurizes combustion section (400). As the hot combustion stream (1A4) expands, the aerovalve (A) acts as a fluidic diode and permits preferential flow in the direction of resonance conduits (502, 502A, 502B, 502C, 502D, 502E, $502^N$, $502^{N+1}$). As the hot gas of the combustion stream (1A4) expands, preferential flow in the direction of the resonance conduits (502, 502A, 502B, 502C, 502D, 502E, $502^N$, $502^{N+1}$) of the heat transfer section (500) is achieved with significant momentum. A vacuum is then created in the combustion section (400) due to the inertia of the combustion stream (1A4) within the resonance conduits (502, 502A, 502B, 502C, 502D, 502E, $502^N$, $502^{N+1}$). Only a small fraction of the combustion stream (1A4) is then permitted to return to the combustion section (400), with the balance of the combustion stream (1A4) exiting the heat transfer section (500). Because the pressure of the combustion section (400) is then below atmospheric pressure, further oxidant and fuel mixture (1A3) is drawn into the combustion section (400) and ignition or auto-ignition takes place. The aerovalve (A) thereafter constrains reverse flow, and the cycle begins anew. Once the first cycle is initiated, operation is thereafter self-sustaining or self-aspirating.

In the present disclosure, the aerodynamic valve, or aerovalve (A), has no moving parts. In embodiments, after the oxidant and fuel mixture (1A3) has ignited in the combustion section (400), a boundary-layer builds in the aerovalve (A) and turbulent eddies choke off much of the reverse flow. Moreover, the combustion stream (1A4) formed in the combustion section (400) is of a much higher temperature than the input oxidant (1A1), fuel (1A2), and oxidant and fuel mixture (1A3). Accordingly, the viscosity of the combustion stream (1A4) is much higher and the reverse resistance of the inner first diameter (D1) of the aerovalve (A), in turn, is much higher than that for forward flow through the same opening. Such phenomena, along with the high inertia of combustion stream (1A4) passing through the resonance conduits (502, 502A, 502B, 502C, 502D, 502E, $502^N$, $502^{N+1}$), combine to yield preferential and mean flow from oxidant inlet section (100) and fuel inlet section (200) to the mixing section (300), combustion section (400), heat transfer section (500), and decoupler section (600).

Thus, the preferred pulse combustion heat exchanger (1000) is a self-aspirating engine, drawing its own oxidant and fuel into the combustion section (400) followed by auto-ignition. In embodiments, the pulse combustion heat exchanger (1000) is not self-igniting but instead relies upon an ignitor (410) or a plurality of ignitors (410A, 410B, 410C) positioned within the combustion section (400) to cause the oxidant and fuel mixture (1A3) to ignite. In embodiments, the pulse combustion heat exchanger (1000) is self-igniting. The disclosed pulse combustion heat exchanger (1000) regulates its own stoichiometry within ranges of firing without the need for extensive controls to regulate the fuel feed to oxidant mass flow rate ratio. As the fuel feed rate is increased, the strength of the pressure pulsations in the combustion section (400) increases, which in turn increases the amount of oxidant (1A1) aspirated by the aerovalve (A), thus allowing the pulse combustion heat exchanger (1000) to automatically maintain a substantially constant stoichiometry over its designed firing range. The induced stoichiometry can be changed by modifying the aerovalve (A) fluidic diodicity.

The preferred pulse combustion heat exchanger (1000) used herein for firing is based on a Helmholtz configuration with an aerovalve (A). The pressure fluctuations, which are combustion-induced in the Helmholtz resonator combustion section (400), coupled with the fluidic diodicity of the aerovalve (A), causes a bias flow of oxidant (1A1), fuel (1A2), oxidant and fuel mixture (1A3), and combustion stream (1A4) from the combustion section (400) to the resonance conduits (502, 502A, 502B, 502C, 502D, 502E, $502^N$, $502^{N+1}$) of the heat transfer section (500). This results in the oxidant (1A1) being self-aspirated by the combustion section (400) and for an average pressure boost to develop in the combustion section (400) to expel a combustion stream (1A4) through the resonance conduits (502, 502A, 502B, 502C, 502D, 502E, $502^N$, $502^{N+1}$).

In embodiments, the combustion stream (1A4) temperature is in a range of from about 1400° to about 3000° F. In the vessel (V100), acoustic pressure wave level in a range of from about 140 to about 195 dB are achievable. In the vessel (V100), temperatures of the material (V106) may range of from about 1000° to about 1700° F. In embodiments, the material (V106) may be a solid, liquid, vapor, or gas. The solid material (V106) may include particles. The production of an intense acoustic wave is an inherent characteristic of pulse combustion. Sound intensity adjacent to the wall of the pulsating combustion section (400) is often in the range of 140-195 dB, and may be altered depending on the desired acoustic field frequency to accommodate the specific application undertaken by the pulse combustion heat exchanger (1000).

In embodiments, the pulse combustion heat exchanger (1000) according to the present disclosure generates a pulsating flow of combustion products and an acoustic pressure wave. In embodiments, the pulse combustion heat exchanger (1000) of the present disclosure produces pressure oscillations or fluctuations in the range of from about 1 psi to about 40 psi and particularly between about 1 psi and 25 psi peak to peak. These fluctuations are substantially sinusoidal. These pressure fluctuation levels are on the order of a sound pressure range of from about 140 dB to about 195 dB and particularly between about 161 dB and 190 dB. The acoustic field frequency range depends primarily on the combustor design and is only limited by the fuel flammability characteristics. In embodiments, the combustion section (400) operates at a frequency in a range of from about 45 Hz to about 200 Hz A rapid pressure oscillation through the combustion section (400) generates an intense oscillating or fluctuating flow field. The oscillating or fluctuating flow field causes the combustion stream (1A4) to be swept away from the oxidant and fuel mixture (1A3), which is firing within the combustion section (400), thus providing access to oxidant (1A1) or fuel (1A2) with little or no diffusion limitation. Secondly, the pulse combustion heat exchanger (1000) experiences very high mass and heat transfer rates within the combustion section (400) and heat transfer section (500).

In embodiments, the combustion section (400) and resonance conduits (502, 502A, 502B, 502C, 502D, 502E, $502^N$, $502^{N+1}$) of the heat transfer section (500) form a tuned Helmholtz resonator. The aerovalve (A) acts as a diode such that self-oxidant aspiration is affected in response to an oscillating pressure in the combustion section (400) induced as a result of heat and mass release from combustion therein.

Various other modifications can be made to the pulse combustion heat exchanger (1000) of the present disclosure. For example, if desired, resonance conduits (502, 502A, 502B, 502C, 502D, 502E, $502^N$, $502^{N+1}$) may employ a number of different designs. For example, the resonance conduits (502, 502A, 502B, 502C, 502D, 502E, $502^N$, $502^{N+1}$) may flare continuously outwardly allowing the entire resonance tube to act as a diffuser to reduce gas exit velocity from the combustion section (400). Moreover, resonance conduits (502, 502A, 502B, 502C, 502D, 502E, 502$^N$, 502$^{N+1}$) may be essentially straight, but have at its outer end a diffuser section that consists of an outwardly flaring tailpipe section, or alternatively, may integrate a diffuser section at the end nearest combustion section (400) with an essentially straight tube extending therefrom.

FIG. 22

FIG. 22 discloses a method to form a cooled combustion stream, the method includes:
- (a) providing a pulse combustion heat exchanger having a longitudinal axis that includes:
    - (a1) an oxidant inlet section connected to a mixing section, the oxidant inlet section configured to accept oxidant;
    - (a2) a fuel inlet section connected to the mixing section, the fuel inlet section configured to accept fuel;
    - (a3) a mixing section connected to a combustion section, the mixing section is configured to accept oxidant from the oxidant inlet section and fuel from the fuel inlet section and mix the oxidant with the fuel to form an oxidant and fuel mixture;
    - (a4) a combustion section connected to a heat transfer section, the combustion section configured to accept and combust the oxidant and fuel mixture from the mixing section to form a pulsating combustion stream;
    - (a5) a heat transfer section connected to a decoupler section, the heat transfer section is configured to accept the pulsating combustion stream from the combustion section and cool the combustion stream by transferring heat to a heat transfer material;
    - (a6) a decoupler section configured to acoustically disengage the cooled combustion stream from the heat transfer section;
- (b) introducing oxidant to the oxidant inlet section;
- (c) introducing fuel to the fuel inlet section;
- (d) introducing oxidant from the oxidant inlet section to the mixing section;
- (e) introducing fuel from the fuel inlet section to the mixing section;
- (f) mixing the oxidant of step (d) with the fuel of step (e) to form an oxidant and fuel mixture;
- (g) introducing the oxidant and fuel mixture of step (f) into the combustion section;
- (h) igniting the oxidant and fuel mixture after step (g) to form a pulsating combustion stream;
- (i) introducing the pulsating combustion stream of step (h) into the heat transfer section;
- (j) transferring heat from the pulsating combustion stream after step (i) to a heat transfer medium while cooling a portion of the pulsating combustion stream to form a cooled combustion stream; and
- (k) transferring the cooled combustion stream of step (j) to the decoupler section and acoustically disengaging the cooled combustion stream from the heat transfer section.

In embodiments, the method further includes: (a) providing a first metal surface in between the combustion section and heat transfer section; and (b) contacting the first metal surface with a first coolant to cool the first metal surface. In embodiments, the first transition section (450) is the first metal surface. In embodiments, the first coolant is water and heat is removed from the first metal surface to generate a first steam.

In embodiments, the method further includes: (a) providing a coolant recycling drum having coolant contained therein and having a drum outlet in fluid communication with the first metal surface and further having drum inlet configured to accept the first steam; (b) transferring coolant from the coolant recycling drum to contact the first metal surface; (c) generating a first steam; and (d) transferring the first steam to the drum inlet of the coolant recycling drum.

In embodiments, the method further includes: (a) providing a first restriction orifice positioned between the drum outlet and the first metal surface; (b) prior to contacting the first metal surface with the coolant, reducing the pressure of the coolant by passing the coolant through the first restriction orifice.

In embodiments, the method further includes: (a) providing a recycling pump in between the drum outlet and the first metal surface, the recycling pump is configured to supply coolant under pressure to the first metal surface; (b) pressurizing the coolant; and (c) passing the pressurized coolant through the first restriction orifice.

In embodiments, the method further includes: (a) providing a second metal surface in between the heat transfer section and decoupler section; (b) contacting the second metal surface with a second coolant to cool the second metal surface. In embodiments, the second transition section (650) is the second metal surface. In embodiments, the second coolant is water and heat is removed from the second metal surface to generate a second steam.

In embodiments, the method further includes: (a) providing a coolant recycling drum having coolant contained therein and having a drum outlet in fluid communication with the second metal surface and further having drum inlet configured to accept the second steam; (b) transferring coolant from the coolant recycling drum to contact the second metal surface; (c) generating a second steam; and (d) transferring the second steam to the drum inlet of the coolant recycling drum.

In embodiments, the method further includes: (a) providing a second restriction orifice positioned between the drum outlet and the second metal surface; (b) prior to contacting the second metal surface with the coolant, reducing the pressure of the coolant by passing the coolant through the second restriction orifice.

In embodiments, the method further includes: (a) providing a recycling pump in between the drum outlet and the second metal surface, the recycling pump is configured to supply coolant under pressure to the second metal surface; (b) pressurizing the coolant; and (c) passing the pressurized coolant through the second restriction orifice.

In embodiments, the method further includes: (a) providing a third metal surface in between the mixing section and combustion section; (b) contacting the third metal surface with a third coolant to cool the third metal surface. In embodiments, the third transition section (350) is the third metal surface. In embodiments, the third coolant is water and heat is removed from the third metal surface to generate a third steam.

In embodiments, the method further includes: (a) providing a coolant recycling drum having coolant contained therein and having a drum outlet in fluid communication with the third metal surface and further having drum inlet configured to accept the third steam; (b) transferring coolant from the coolant recycling drum to contact the third metal surface; (c) generating a third steam; and (d) transferring the third steam to the drum inlet of the coolant recycling drum.

In embodiments, the method further includes: (a) providing a third restriction orifice positioned between the drum outlet and the third metal surface; (b) prior to contacting the third metal surface with the coolant, reducing the pressure of the coolant by passing the coolant through the third restriction orifice.

In embodiments, the method further includes: (a) providing a recycling pump in between the drum outlet and the third metal surface, the recycling pump is configured to supply coolant under pressure to the third metal surface; (b) pressurizing the coolant; and (c) passing the pressurized coolant through the third restriction orifice.

In embodiments, the method further includes: (a) providing a plurality of aerovalves within the mixing section, the aerovalves have a converging-diverging geometry and are configured to provide turbulent mixing of the oxidant and fuel within the mixing section and minimize backflow of the oxidant and fuel mixture from the mixing section into the oxidant inlet section or fuel inlet section; (b) subjecting the oxidant to a first drop in pressure from the oxidant inlet section to the mixing section; and (c) subjecting the fuel to a second drop in pressure from the fuel inlet section to the mixing section.

In embodiments, the method further includes: (a) providing plurality of ignitors in fluid communication with the combustion section, each ignitor having an ignitor input configured to introduce an ignitor mixture to the ignitor, the ignitor input being in fluid communication with an ignitor oxidant supply and an ignitor fuel supply; (b) introducing an ignitor mixture to each of the plurality of ignitors; (c) igniting the oxidant and fuel mixture within the combustion section with the plurality of ignitors.

It will be appreciated that the foregoing examples, given for purposes of illustration, are not to be construed as limiting the scope of this disclosure. Although only a few exemplary embodiments of this disclosure have been described in detail above, those skilled in the art will readily appreciate that many variation of the theme are possible in the exemplary embodiments without materially departing from the novel teachings and advantages of this disclosure. Accordingly, all such modifications are intended to be included within the scope of this disclosure that is defined in the following claims and all equivalents thereto. Further, it is recognized that many embodiments may be conceived in the design of a given system that do not achieve all of the advantages of some embodiments, yet the absence of a particular advantage shall not be construed to necessarily mean that such an embodiment is outside the scope of the present disclosure.

Thus, specific systems and methods of an automated fluidized bed level and density measurement system have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Although the foregoing text sets forth a detailed description of numerous different embodiments of the disclosure, it should be understood that the scope of the disclosure is defined by the words of the claims set forth at the end of this patent. The detailed description is to be construed as exemplary only and does not describe every possible embodiment of the disclosure because describing every possible embodiment would be impractical, if not impossible. Numerous alternative embodiments could be implemented, using either current technology or technology developed after the filing date of this patent, which would still fall within the scope of the claims defining the disclosure.

Thus, many modifications and variations may be made in the techniques and structures described and illustrated herein without departing from the spirit and scope of the present disclosure. Accordingly, it should be understood that the methods and apparatus described herein are illustrative only and are not limiting upon the scope of the disclosure.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the disclosure and does not pose a limitation on the scope of the disclosure otherwise claimed. No language in the specification should be construed as indicating any non-claimed element essential to the practice of the disclosure.

Groupings of alternative elements or embodiments of the disclosure disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

LISTING OF REFERENCE NUMERALS aerovalve (A, A', A'', A''', A'''', $A^N$, $A^{N+1}$)
oxidant inlet (1A0)
oxidant and fuel mixture outlet (2A0)
rear end (1E1)
forward end (2E1)
oxidant (1A1)
fuel (1A2)
first fuel (1A2A)
second fuel (1A2B)
oxidant and fuel mixture (1A3)
combustion stream (1A4)
cooled combustion stream (1A5)
ignitor mixture (1A6)
first ignitor mixture (1A6A)
second ignitor mixture (1A6B)
exchanger longitudinal axis (X2)
aerovalve longitudinal axis (X1)
rearwardly facing rear surface (1E1S)
forwardly facing forward surface (2E1S)
interior (A-IN)
outer surface (S)
first inner conical surface (S1)
second inner conical surface (S2)
third inner conical surface (S3)
first angle (A1)
second angle (A2)
third angle (A3)
outer diameter (D0)
first inner diameter (D1)
second inner diameter (D2)
third inner diameter (D3)
first cross-sectional side view (I-I)
second cross-sectional side view (III-III)
third cross-sectional side view (V-V)
first forward view (II-II)
second forward view (IV-IV)
third forward view (VI-VI)
first fuel inlet port (1A)
second fuel inlet port (1B)
third fuel inlet port (1C)
fourth fuel inlet port (1D)
fifth fuel inlet port (1E)
sixth fuel inlet port (1F)
seventh fuel inlet port (1G)
eighth fuel inlet port (1H)
ninth fuel inlet port (1$i$)
tenth fuel inlet port (1J)
eleventh fuel inlet port (1K)
twelfth fuel inlet port (1L)
first fuel outlet port (2A)
second fuel outlet port (2B)
third fuel outlet port (2C)
fourth fuel outlet port (2D)
fifth fuel outlet port (2E)
sixth fuel outlet port (2F)
seventh fuel outlet port (2G)
eighth fuel outlet port (2H)
ninth fuel outlet port (2$i$)
tenth fuel outlet port (2J)
eleventh fuel outlet port (2K)
twelfth fuel outlet port (2L)
first fuel transfer channel (3A)
second fuel transfer channel (3B)
third fuel transfer channel (3C)
fourth fuel transfer channel (3D)
fifth fuel transfer channel (3E)
sixth fuel transfer channel (3F)
seventh fuel transfer channel (3G)
eighth fuel transfer channel (3H)
ninth fuel transfer channel (3I)
tenth fuel transfer channel (3J)
eleventh fuel transfer channel (3K)
twelfth fuel transfer channel (3L)
channel diameter (XX1)
total length (L)
first length (L1)
second length (L2)
third length (L3)
fourth length (L4)
fifth length (L5)
sixth length (L6)
seventh length (L7)
pulse combustion heat exchanger (1000)
first pulse combustion heat exchanger (1000A)
second pulse combustion heat exchanger (1000B)
first flange (PC1, PC1A, PC1B)
second flange (PC2, PC2A, PC2B)
vessel (V100)
interior (V102)
side wall (V104)
heat transfer medium (V106)
energy sink (V108)
inlet (V110)
mass input (V111)
outlet (V112)
mass output (V113)
first vessel flange (V1F)
second vessel flange (V2F)
third vessel flange (V3F)
fourth vessel flange (V4F)
oxidant inlet section (100)
oxidant inlet (102)
first plate (103)
second plate (104)
tubesheet (104A)
aerovalve aperture (106, 106A, 106B, 106C, 106D, $106^N$, $106^{N+1}$)
first fuel aperture (108)
first first fuel aperture (108A)
second first fuel aperture (108B)
second fuel aperture (110)
first second fuel aperture (110A)
second second fuel aperture (110B)
oxidant inlet section side-view (XI-XI)
fuel inlet section (200)
fuel inlet (202)
first fuel inlet (202A)
second fuel inlet (202B)
third plate (204)
tubesheet (205)
aperture (206, 206A, 206B, 206C, 206D, $206^N$, $206^{N+1}$)
mixing section (300)
third transition section (350)
third interior space (350-1)

third coolant (351)
third coolant inlet (352)
cooling water supply (353)
third coolant outlet (354)
cooling water return (355)
third transition plate (356)
tubesheet (357)
inlet aperture (358)
outlet aperture (359)
aerovalve aperture (360, 360A, 360B)
fuel injector (370)
first fuel injector (370A)
second fuel injector (370B)
first fuel injector conduit (372A)
second fuel injector conduit (372B)
first fuel injector distributor (374A)
second fuel injector distributor (374B)
combustion section (400)
fourth plate (402)
tubesheet (403)
aperture (404, 404A, 404B, 404C, 404D, $404^N$, $404^{N+1}$)
first aperture (404A)
second aperture (404B)
third aperture (404C)
fourth aperture (404D)
fifth aperture (404E)
first refractory section (406)
second refractory section (408)
combustion section side-view (IX-IX)
ignitor (410)
first ignitor (410A)
second ignitor (410B)
first ignitor aperture (410A1)
second ignitor aperture (410A2)
third ignitor aperture (410A3)
first second ignitor aperture (410A21)
second second ignitor aperture (410A22)
third second ignitor aperture (410A23)
fourth second ignitor aperture (410A24)
ignitor input (412)
first ignitor input (412A)
second ignitor input (412B)
first transition section (450)
first interior space (450-1)
first coolant (451)
first coolant inlet (452)
first coolant outlet (454)
plate (456)
tubesheet (457)
aperture (458, 458A, 458B, 458C)
heat transfer section (500)
resonance conduit (502, 502A, 502B, 502C, 502D, 502E, $502^N$, $502^{N+1}$)
first resonance conduit (502A)
second resonance conduit (502B)
third resonance conduit (502C)
fourth resonance conduit (502D)
fifth resonance conduit (502E)
radiation shield (504, 504A, 504B, 504C)
first baffle (506)
second baffle (508)
first support member (510)
second support member (512)
first support member first connection (510X)
first support member second connection (510Y)
second support member first connection (512X)
second support member second connection (512Y)
decoupler section (600)
fifth plate (602)
tubesheet (603)
aperture (604, 604A, 604B, 604C, 604D, $604^N$, $604^{N+1}$)
combustion stream outlet (606)
second transition section (650)
second interior space (650-1)
second coolant (651)
second coolant inlet (652)
second coolant outlet (654)
sixth plate (656)
tubesheet (657)
aperture (658, 658A, 658B, 658C)
coolant recycling drum (800)
water (802)
water inlet (804)
level sensor (LT1)
level control valve (LV1)
steam (806)
steam outlet (808)
pressure sensor (PT0)
pressure control valve (PV0)
third transition section coolant (809)
recycling pump (810)
pump suction conduit (811)
drum outlet (812)
pump discharge conduit (813)
first transition section coolant (814)
supply coolant (815)
second transition section coolant (816)
coolant transfer conduit (817)
coolant (818)
coolant (820)
steam conduit (821)
drum inlet (822)
first temperature sensor (T1)
second temperature sensor (T2)
first restriction orifice (RO1)
second restriction orifice (RO2)
third restriction orifice (RO3)

What is claimed is:

1. An aerovalve (A), having an aerovalve longitudinal axis (X1), an outer surface (S) with an outer diameter (D0), an interior (A-IN), a rear end (1E1) having a rearwardly facing rear surface (1E1S), a forward end (2E1) having a forwardly facing forward surface (2E1S), and a total aerovalve length (L) defined between the rear and forward ends (1E1, 2E1) along the aerovalve longitudinal axis (X1), the aerovalve (A) further comprising:
an oxidant inlet (1A0) located at the rear end (1E1), the oxidant inlet (1A0) configured to introduce oxidant (1A1) into the interior (A-IN) of the aerovalve (A);
an oxidant and fuel mixture outlet (2A0) located at the forward end (2E1), the oxidant and fuel mixture outlet (2A0) configured to expel an oxidant and fuel mixture (1A3) present in the interior (A-IN) of the aerovalve (A);
a first plurality of fuel inlet ports (1A, 1B, 1C, ... ) opening to the outer surface (S), a second plurality of fuel outlet ports (2A, 2B, 2C, ... ) opening to the interior (A-IN), and a third plurality of fuel transfer channels (3A, 3B, 3C, ... ) configured to transfer fuel (1A2) from the first plurality of fuel inlet ports (1A, 1B, 1C, ... ) to the second plurality of fuel outlet ports (2A, 2B, 2C, ... );
a first inner conical surface (S1) tapering radially inwardly at a first angle (A1) to a first inner diameter (D1), the first inner conical surface (S1) extending in the forward direction from proximate the rear end (1E1) for a first length (L1) along the aerovalve longitudinal axis (X1);

a second inner conical surface (S2) expanding radially outwardly at a second angle (A2) to a second inner diameter (D2), the second inner conical surface (S2) extending in the forward direction from proximate the first inner conical surface (S1) for a second length (L2) along the aerovalve longitudinal axis (X1), the second inner diameter (D2) being less than the outer diameter (D0); and a third inner conical surface (S3) expanding radially outwardly at a third angle (A3) to a third inner diameter (D3), the third inner conical surface (S3) extending in the forward direction from proximate the second inner conical surface (S2) for a third length (L3) along the aerovalve longitudinal axis (X1), the third inner diameter (D3) being greater than the first and second inner diameters (D1, D2) and less than the outer diameter (D0);

wherein:
the first angle (A1) is greater than the second angle (A2);
the third angle (A3) is greater than the second angle (A2); and
the second plurality of fuel outlet ports (2A, 2B, 2C, . . . ) are positioned on the third inner conical surface (S3).

2. A cylindrical aerovalve (A) according to claim 1, wherein the first angle (A1) ranges from between 30 degrees to 60 degrees.

3. A cylindrical aerovalve (A) according to claim 1, wherein the second angle (A2) ranges from between 1.5 degrees to 11.25 degrees.

4. The cylindrical aerovalve (A) according to claim 1, wherein the third angle (A3) ranges from between 11.25 degrees to 90 degrees.

5. The cylindrical aerovalve (A) according to claim 1, wherein the total aerovalve length (L) to first inner diameter (D1) ratio ranges from 2.5 to 10.

6. The cylindrical aerovalve (A) according to claim 1, wherein the total aerovalve length (L) to outer diameter (D0) ratio ranges from 1 to 8.

7. The cylindrical aerovalve (A) according to claim 1, wherein the first inner diameter (D1) to outer diameter (D0) ratio ranges from 1.25 to 3.75.

8. A pulse combustion heat exchanger (1000) that is configured to accept oxidant (1A1) and fuel (1A2) and output a cooled combustion stream (1A5), including:
(a) an oxidant inlet section (100) that is configured to accept oxidant (1A1);
(b) a fuel inlet section (200) that is configured to accept fuel (1A2);
(c) a mixing section (300) including one or more aerovalves in accordance with claim 1 (A, A', A"); that are configured to accept and mix oxidant (1A1) from the oxidant inlet section (100) with fuel (1A2) from the fuel inlet section (200) to create an oxidant and fuel mixture (1A3);
(d) a combustion section (400) configured to receive and combust the oxidant and fuel mixture (1A3) from the mixing section (300) to produce a pulsating combustion stream (1A4);
(e) a heat transfer section (500) configured to receive the combustion stream (1A4) from the combustion section (400), the heat transfer section (500) including one or more resonance conduits (502, 502A, 502B, 502C, 502D, 502E) that are configured to transfer heat from the combustion stream (1A4) to an energy sink (V108), wherein combustion of the oxidant and fuel mixture (1A3) may continue to take place within the heat transfer section (500);
(f) a first transition section (450) positioned between the combustion section (400) and the heat transfer section (500), the first transition section (450) comprising a first coolant path configured to receive a first coolant (451);
(g) a second transition section (650) connected to the heat transfer section (500) and configured to receive the combustion stream (1A4) from the heat transfer section (500) and output a cooled combustion stream (1A5), the second transition section (650) comprising a second coolant path configured to receive a second coolant (651); and
(h) a decoupler section (600) connected to the second transition section (650) and configured to accept the cooled combustion stream (1A5) from the second transition section (650) and output the cooled combustion stream (1A5) via a combustion stream outlet (606).

9. The pulse combustion heat exchanger (1000) according to claim 8, wherein the first transition section (450) comprises:
a first pair of parallel tubesheets (403, 457) defining a first interior space (450-1) therebetween;
a first coolant inlet (452) in fluid communication with the first interior space (450-1) and configured to receive the first coolant (451); and
a first coolant outlet (454) in fluid communication with the first interior space (450-1); wherein:
the first coolant inlet (452), the first interior space (450-1) and the first coolant outlet (454) together define the first coolant path through the first transition section (450).

10. The pulse combustion heat exchanger (1000) according to claim 9, wherein the second transition section (650) comprises:
a second pair of parallel tubesheets (603, 657) defining a second interior space (650-1) therebetween;
a second coolant inlet (652) in fluid communication with the second interior space (650-1) that is configured to receive the second coolant (652); and
a second coolant outlet (654) in fluid communication with the second interior space (650-1); wherein:
the second coolant inlet (652), the second interior space (650-1) and the second coolant outlet (654) together define the second coolant path through the second transition section (450).

11. The pulse combustion heat exchanger (1000) according to claim 8, further comprising:
a third transition section (350) positioned between the mixing section (300) and the combustion section (400) that is provided with a third coolant (351).

12. The pulse combustion heat exchanger (1000) according to claim 11, wherein the third transition section (350) comprises:
a third pair of parallel tubesheets (357, 205) defining a third interior space (350-1) therebetween;
a third coolant inlet (352) in fluid communication with the third interior space (350-1) that is configured to receive the third coolant (351); and
a third coolant outlet (354), in fluid communication with the third interior space (350-1); wherein:

the third coolant inlet (352), the third interior space (350-1) and the third coolant outlet (354) together define a third coolant path through the third transition section (350).

13. The pulse combustion heat exchanger (1000) according to claim 8, further comprising:
    at least one ignitor (410, 410A, 410B) is in fluid communication with the combustion section (400); and
    an ignitor input (412) configured to introduce an ignitor mixture (1A6) to the ignitor (410), the ignitor input (412) being in fluid communication with an ignitor oxidant supply and an ignitor fuel supply.

14. The pulse combustion heat exchanger (1000) according to claim 13, further comprising:
    a plurality of ignitors (410A, 410B) in fluid communication with the combustion section (400).

15. The pulse combustion heat exchanger (1000) according to claim 8, further comprising:
    a vessel (V100) having an interior (V102) defined by at least one side wall (V104); and
    a heat transfer medium (V106) occupying the vessel's interior (V102) and configured to accept heat from the heat transfer section (500) and serve as an energy sink (V108).

16. The pulse combustion heat exchanger (1000) according to claim 8, wherein:
    the first transition section (450) is provided with a first coolant inlet (452) and a first coolant outlet (454);
    the second transition section (650) is provided with a second coolant inlet (652) and a second coolant outlet (654);
    the heat exchanger further comprises a coolant recycling drum (800) having a drum outlet (812) in fluid communication with the first and second coolant inlets (452, 652) and further having drum inlet (822) in fluid communication with the first and second coolant outlets (454, 654); and
    a recycling pump (810) is interposed between the drum outlet (812) and the first and second coolant inlets (452, 652), the recycling pump (810) configured to supply coolant (815) under pressure to the first and second coolant inlets (452, 652).

17. The pulse combustion heat exchanger (1000) according to claim 16, further comprising:
    a first restriction orifice (RO1) positioned between the recycling pump (810) and the first coolant inlet (452); and
    a second restriction orifice (RO2) positioned in between the recycling pump (810) and the second coolant inlet (652).

18. The pulse combustion heat exchanger (1000) according to claim 16, further comprising:
    a third transition section (350) between the mixing section (300) and the combustion section (400), the third transition section (350) having a third coolant inlet (352) and a third coolant outlet (354); wherein:
    the drum outlet (812) is in fluid communication with the third coolant inlet (352) and the drum inlet (822) is in fluid communication with the third coolant outlet (354); and
    the recycling pump (810) is interposed between the drum outlet (812) and the third coolant inlet (352), the recycling pump (810) configured to supply coolant (815) under pressure to the third coolant inlet (352).

19. The pulse combustion heat exchanger (1000) according to claim 18, further comprising:
    a first restriction orifice (RO1) positioned between the recycling pump (810) and the first coolant inlet (452);
    a second restriction orifice (RO2) positioned in between the recycling pump (810) and the second coolant inlet (652); and
    a third restriction orifice (RO3) positioned between the coolant recycling drum (800) and the third coolant inlet (352).

20. The pulse combustion heat exchanger (1000) according to claim 8, further comprising:
    a third transition section (350) between the mixing section (300) and the combustion section (400), the third transition section (350) having a third coolant inlet (352) and a third coolant outlet (354);
    a coolant recycling drum (800) having a drum outlet (812) in fluid communication with the third coolant inlet (352) and further having drum inlet (822) in fluid communication with the third coolant outlet (354); and
    a recycling pump (810) interposed between the drum outlet (812) and the third coolant inlet (352), the recycling pump (810) configured to supply coolant (815) under pressure to the third coolant inlets (352).

21. The pulse combustion heat exchanger (1000) according to claim 20, further comprising:
    a third restriction orifice (RO3) positioned between the coolant recycling drum (800) and the third coolant inlet (352).

22. The pulse combustion heat exchanger (1000) according to claim 8, further comprising:
    a plurality of fuel injectors (370A, 370B) location in the fuel inlet section (200), each fuel injector including a fuel injector conduit (372A, 372B) connected to a fuel injector distributor (374A, 374B), wherein:
    the fuel injector conduit (372A, 372B) is configured to accept said fuel (1A2), and
    fuel injector distributor (374A, 374B) is configured to transfer the fuel (1A2) from the fuel injector conduit (372A, 372B) into the mixing section (300).

* * * * *